(12) United States Patent (10) Patent No.: US 7,724,704 B2
Simons et al. (45) Date of Patent: May 25, 2010

(54) WIRELESS VLAN SYSTEM AND METHOD

(75) Inventors: Michael Terry Simons, Pleasanton, CA (US); David Bradburn Aragon, Berkeley, CA (US)

(73) Assignee: Beiden Inc., St. Louis, MO (US)

( * ) Notice: Subject to any disclaimer, the term of this patent is extended or adjusted under 35 U.S.C. 154(b) by 913 days.

(21) Appl. No.: 11/487,722

(22) Filed: Jul. 17, 2006

(65) Prior Publication Data

US 2008/0013481 A1    Jan. 17, 2008

(51) Int. Cl.
*H04L 1/00* (2006.01)
*H04W 4/00* (2009.01)

(52) U.S. Cl. ...................................... 370/329; 370/338

(58) Field of Classification Search ................. 370/338, 370/329; 711/164
See application file for complete search history.

(56) References Cited

U.S. PATENT DOCUMENTS

| | | |
|---|---|---|
| 3,641,433 A | 2/1972 | Mifflin et al. |
| 4,168,400 A | 9/1979 | De Couasnon et al. |
| 4,176,316 A | 11/1979 | DeRoas et al. |
| 4,247,908 A | 1/1981 | Lockhart et al. |
| 4,291,401 A | 9/1981 | Bachmann |
| 4,291,409 A | 9/1981 | Weinberg et al. |
| 4,409,470 A | 10/1983 | Shepard et al. |
| 4,460,120 A | 7/1984 | Shepard et al. |
| 4,475,208 A | 10/1984 | Ricketts |
| 4,494,238 A | 1/1985 | Groth, Jr. |
| 4,500,987 A | 2/1985 | Hasegawa |

(Continued)

FOREIGN PATENT DOCUMENTS

WO    WO94/03986    2/1994

(Continued)

OTHER PUBLICATIONS

U.S. Appl. No. 11/487,722, filed Jul. 2006, Simons et al.

(Continued)

*Primary Examiner*—Vincent P Harper
*Assistant Examiner*—Omoniyi A Obayanju
(74) *Attorney, Agent, or Firm*—Perkins Coie LLP

(57) ABSTRACT

This specification describes a system and method that can offer, among other advantages, a technique for resource assignment that involves obtaining a group of resources, repeatedly selecting a resource from the group of resources until a resource that is available is selected, and associating a client or process with that resource. An example of a method according to the technique includes obtaining a group of VLANs for assignment to a client based on client identity, selecting a first choice from the group of VLANs, selecting a next choice from the group of VLANs if the first choice is unavailable, and connecting the client to the selected VLAN. The client identity may include, by way of example but not limitation, a MAC address, an SSID, or some other known or convenient way to identify the client. A system constructed according to the technique may include, by way of example but not limitation, memory, a resource group name decoder, a value calculator, an index calculator, and a selector. The memory may include, for example, a resource name buffer, an identity buffer, a result buffer, a resource count buffer, a resource name array, and a selected resource buffer.

10 Claims, 13 Drawing Sheets

U.S. PATENT DOCUMENTS

| | | | |
|---|---|---|---|
| 4,503,533 A | 3/1985 | Tobagi et al. |
| 4,550,414 A | 10/1985 | Guinon et al. |
| 4,562,415 A | 12/1985 | McBiles |
| 4,630,264 A | 12/1986 | Wah |
| 4,635,221 A | 1/1987 | Kerr |
| 4,639,914 A | 1/1987 | Winters |
| 4,644,523 A | 2/1987 | Horwitz |
| 4,672,658 A | 6/1987 | Kavehrad et al. |
| 4,673,805 A | 6/1987 | Shepard et al. |
| 4,707,839 A | 11/1987 | Andren et al. |
| 4,730,340 A | 3/1988 | Frazier |
| 4,736,095 A | 4/1988 | Shepard et al. |
| 4,740,792 A | 4/1988 | Sagey et al. |
| 4,758,717 A | 7/1988 | Shepard et al. |
| 4,760,586 A | 7/1988 | Takeda |
| 4,789,983 A | 12/1988 | Acampora et al. |
| 4,829,540 A | 5/1989 | Waggener et al. |
| 4,850,009 A | 7/1989 | Zook et al. |
| 4,872,182 A | 10/1989 | Mcrae et al. |
| 4,894,842 A | 1/1990 | Brockhaven et al. |
| 4,901,307 A | 2/1990 | Gilhousen et al. |
| 4,933,952 A | 6/1990 | Albrieux et al. |
| 4,933,953 A | 6/1990 | Yagi |
| 4,995,053 A | 2/1991 | Simpson et al. |
| 5,008,899 A | 4/1991 | Yamamoto |
| 5,029,183 A | 7/1991 | Tymes |
| 5,103,459 A | 4/1992 | Gilhousen et al. |
| 5,103,461 A | 4/1992 | Tymes |
| 5,109,390 A | 4/1992 | Gilhousen et al. |
| 5,142,550 A | 8/1992 | Tymes |
| 5,151,919 A | 9/1992 | Dent |
| 5,157,687 A | 10/1992 | Tymes |
| 5,187,675 A | 2/1993 | Dent et al. |
| 5,231,633 A | 7/1993 | Hluchyj et al. |
| 5,280,498 A | 1/1994 | Tymes et al. |
| 5,285,494 A | 2/1994 | Sprecher et al. |
| 5,329,531 A | 7/1994 | Diepstraten et al. |
| 5,418,812 A | 5/1995 | Reyes et al. |
| 5,448,569 A | 9/1995 | Huang et al. |
| 5,450,615 A | 9/1995 | Fortune et al. |
| 5,465,401 A | 11/1995 | Thompson |
| 5,479,441 A | 12/1995 | Tymes et al. |
| 5,483,676 A | 1/1996 | Mahany et al. |
| 5,488,569 A | 1/1996 | Kaplan et al. |
| 5,491,644 A | 2/1996 | Pickering et al. |
| 5,517,495 A | 5/1996 | Lund |
| 5,519,762 A | 5/1996 | Bartlett |
| 5,528,621 A | 6/1996 | Heiman et al. |
| 5,561,841 A | 10/1996 | Markus |
| 5,568,513 A | 10/1996 | Croft et al. |
| 5,584,048 A | 12/1996 | Wieczorek |
| 5,598,532 A | 1/1997 | Liron |
| 5,630,207 A | 5/1997 | Gitlin et al. |
| 5,640,414 A | 6/1997 | Blakeney et al. |
| 5,649,289 A | 7/1997 | Wang et al. |
| 5,668,803 A | 9/1997 | Tymes et al. |
| 5,793,303 A | 8/1998 | Koga |
| 5,794,128 A | 8/1998 | Brockel et al. |
| 5,812,589 A | 9/1998 | Sealander et al. |
| 5,815,811 A | 9/1998 | Pinard et al. |
| 5,828,960 A | 10/1998 | Tang et al. |
| 5,838,907 A | 11/1998 | Hansen |
| 5,844,900 A | 12/1998 | Hong et al. |
| 5,872,968 A | 2/1999 | Knox et al. |
| 5,875,179 A | 2/1999 | Tikalsky |
| 5,896,561 A | 4/1999 | Schrader et al. |
| 5,915,214 A | 6/1999 | Reece et al. |
| 5,920,821 A | 7/1999 | Seazholtz et al. |
| 5,933,607 A | 8/1999 | Tate et al. |
| 5,949,988 A | 9/1999 | Feisullin et al. |
| 5,953,669 A | 9/1999 | Stratis et al. |
| 5,960,335 A | 9/1999 | Umemoto et al. |
| 5,982,779 A | 11/1999 | Krishnakumar et al. |
| 5,987,062 A | 11/1999 | Engwer et al. |
| 5,987,328 A | 11/1999 | Ephremides et al. |
| 6,005,853 A | 12/1999 | Wang et al. |
| 6,011,784 A | 1/2000 | Brown |
| 6,078,568 A | 6/2000 | Wright |
| 6,088,591 A | 7/2000 | Trompower |
| 6,118,771 A | 9/2000 | Tajika et al. |
| 6,119,009 A | 9/2000 | Baranger et al. |
| 6,160,804 A | 12/2000 | Ahmed et al. |
| 6,188,694 B1 | 2/2001 | Fine et al. |
| 6,199,032 B1 | 3/2001 | Anderson |
| 6,208,629 B1 | 3/2001 | Jaszewski et al. |
| 6,208,841 B1 | 3/2001 | Wallace et al. |
| 6,218,930 B1 | 4/2001 | Katzenberg et al. |
| 6,240,078 B1 | 5/2001 | Kuhnel et al. |
| 6,240,083 B1 | 5/2001 | Wright |
| 6,256,300 B1 | 7/2001 | Ahmed et al. |
| 6,256,334 B1 | 7/2001 | Adachi |
| 6,262,988 B1 | 7/2001 | Vig |
| 6,285,662 B1 | 9/2001 | Watannabe |
| 6,304,596 B1 | 10/2001 | Yamano et al. |
| 6,317,599 B1 | 11/2001 | Rappaport et al. |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ulfongene |
| 6,404,772 B1 | 6/2002 | Beach et al. |
| 6,473,449 B1 | 10/2002 | Cafarella et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,580,700 B1 | 6/2003 | Pinard et al. |
| 6,587,680 B1 | 7/2003 | Ata-Laurila et al. |
| 6,614,787 B1 | 9/2003 | Jain et al. |
| 6,624,762 B1 * | 9/2003 | End, III ........................ 341/51 |
| 6,625,454 B1 | 9/2003 | Rappaport et al. |
| 6,631,267 B1 | 10/2003 | Clarkson et al. |
| 6,659,947 B1 | 12/2003 | Carter et al. |
| 6,687,498 B2 | 2/2004 | McKenna et al. |
| 6,725,260 B1 | 4/2004 | Philyaw |
| 6,747,961 B1 | 6/2004 | Ahmed et al. |
| 6,839,338 B1 | 1/2005 | Amara et al. |
| 6,839,348 B2 | 1/2005 | Tang et al. |
| 6,879,812 B2 | 4/2005 | Agrawal et al. |
| 6,957,067 B1 | 10/2005 | Iyer et al. |
| 6,973,622 B1 | 12/2005 | Rappaport et al. |
| 6,978,301 B2 | 12/2005 | Tindal |
| 7,020,773 B1 | 3/2006 | Otway et al. |
| 7,062,566 B2 | 6/2006 | Amara |
| 7,068,999 B2 | 6/2006 | Ballai |
| 7,110,756 B2 | 9/2006 | Diener |
| 7,146,166 B2 | 12/2006 | Backes et al. |
| 7,155,518 B2 | 12/2006 | Forslow |
| 7,221,927 B2 | 5/2007 | Kolar et al. |
| 7,280,495 B1 | 10/2007 | Zweig at al. |
| 7,317,914 B2 | 1/2008 | Adya et al. |
| 7,324,468 B2 | 1/2008 | Fischer |
| 7,376,080 B1 | 5/2008 | Riddle et al. |
| 7,489,648 B2 | 2/2009 | Griswold |
| 7,509,096 B2 | 3/2009 | Palm et al. |
| 7,529,925 B2 | 5/2009 | Harkins |
| 7,551,619 B2 | 6/2009 | Tiwari |
| 2002/0052205 A1 | 5/2002 | Belostofsky et al. |
| 2002/0080752 A1 | 6/2002 | Forslow |
| 2002/0095486 A1 | 7/2002 | Bahl |
| 2002/0101868 A1 | 8/2002 | Clear et al. |
| 2002/0191572 A1 | 12/2002 | Weinstein et al. |
| 2003/0014646 A1 | 1/2003 | Buddhikot et al. |
| 2003/0018889 A1 | 1/2003 | Burnett et al. |
| 2003/0055959 A1 * | 3/2003 | Sato ........................ 709/224 |

| | | |
|---|---|---|
| 2003/0107590 A1 | 6/2003 | Levillain et al. |
| 2003/0174706 A1 | 9/2003 | Shankar et al. |
| 2003/0227934 A1 | 12/2003 | White et al. |
| 2004/0003285 A1 | 1/2004 | Whelan et al. |
| 2004/0019857 A1* | 1/2004 | Teig et al. ............ 716/1 |
| 2004/0025044 A1 | 2/2004 | Day |
| 2004/0047320 A1 | 3/2004 | Eglin |
| 2004/0053632 A1 | 3/2004 | Nikkelen et al. |
| 2004/0062267 A1 | 4/2004 | Minami et al. |
| 2004/0064560 A1 | 4/2004 | Zhang et al. |
| 2004/0068668 A1 | 4/2004 | Lor et al. |
| 2004/0095914 A1 | 5/2004 | Katsube et al. |
| 2004/0095932 A1 | 5/2004 | Astarabadi et al. |
| 2004/0120370 A1 | 6/2004 | Lupo |
| 2004/0143428 A1 | 7/2004 | Rappaport et al. |
| 2004/0208570 A1 | 10/2004 | Reader |
| 2004/0221042 A1 | 11/2004 | Meier |
| 2004/0230370 A1 | 11/2004 | Tzamaloukas |
| 2004/0236702 A1 | 11/2004 | Fink et al. |
| 2004/0259555 A1 | 12/2004 | Rappaport et al. |
| 2005/0030929 A1 | 2/2005 | Swier et al. |
| 2005/0054326 A1 | 3/2005 | Rogers |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |
| 2005/0073980 A1 | 4/2005 | Thomson et al. |
| 2005/0128989 A1 | 6/2005 | Bhagwat et al. |
| 2005/0157730 A1 | 7/2005 | Grant et al. |
| 2005/0180358 A1 | 8/2005 | Kolar et al. |
| 2005/0181805 A1 | 8/2005 | Gallagher |
| 2005/0193103 A1 | 9/2005 | Drabik |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0245269 A1 | 11/2005 | Demirhan et al. |
| 2005/0259597 A1 | 11/2005 | Benedetto et al. |
| 2005/0273442 A1 | 12/2005 | Bennett et al. |
| 2005/0276218 A1 | 12/2005 | Ooghe et al. |
| 2006/0045050 A1 | 3/2006 | Floros et al. |
| 2006/0104224 A1 | 5/2006 | Singh et al. |
| 2006/0161983 A1 | 7/2006 | Cothrell et al. |
| 2006/0174336 A1 | 8/2006 | Chen |
| 2006/0200862 A1 | 9/2006 | Olson et al. |
| 2006/0245393 A1 | 11/2006 | Bajic |
| 2006/0248331 A1 | 11/2006 | Harkins |
| 2006/0276192 A1 | 12/2006 | Dutta et al. |
| 2007/0064718 A1 | 3/2007 | Ekl et al. |
| 2007/0083924 A1 | 4/2007 | Lu |
| 2007/0086378 A1 | 4/2007 | Matta et al. |
| 2007/0091889 A1 | 4/2007 | Xlao et al. |
| 2007/0189222 A1 | 8/2007 | Kolar et al. |
| 2007/0260720 A1 | 11/2007 | Morain |
| 2008/0013481 A1 | 1/2008 | Simons et al. |
| 2008/0096575 A1 | 4/2008 | Aragon et al. |
| 2008/0107077 A1 | 5/2008 | Murphy |
| 2008/0114784 A1 | 5/2008 | Murphy |
| 2008/0117822 A1 | 5/2008 | Murphy et al. |
| 2008/0151844 A1 | 6/2008 | Tiwari |
| 2008/0162921 A1 | 7/2008 | Chesnutt et al. |
| 2009/0198999 A1 | 8/2009 | Harkins |

FOREIGN PATENT DOCUMENTS

| | | |
|---|---|---|
| WO | WO99/11003 | 3/1999 |
| WO | WO 03/085544 A1 | 10/2003 |
| WO | WO 2004/095192 A2 | 11/2004 |
| WO | WO 2004/095800 A1 | 11/2004 |

OTHER PUBLICATIONS

U.S. Appl. No. 11/592,891, filed Nov. 2006, Murphy, James.
U.S. Appl. No. 11/595,119, filed Nov. 2006, Murphy, James.
U.S. Appl. No. 11/604,075, filed Nov. 2006, Murphy et al.
U.S. Appl. No. 11/643,329, filed Dec. 2006, Towari, Manish.
U.S. Appl. No. 11/648,359, filed Dec. 2006, Gast et al.
U.S. Appl. No. 11/690,654, filed Mar. 2007, Keenly et al.
U.S. Appl. No. 11/801,964, filed May 2007, Simone et al.
U.S. Appl. No. 11/845,029, filed Aug. 2007, Gast, Mathew S.
U.S. Appl. No. 11/852,234, filed Sep. 2007, Gast et al.
U.S. Appl. No. 11/944,346, filed Nov. 2007, Gast, Mathew S.
U.S. Appl. No. 11/966,912, filed Dec. 2007, Chesnutt et al.
U.S. Appl. No. 11/970,484, filed Jan. 2008, Gast, Mathew S.
U.S. Appl. No. 11/975,134, filed Oct. 2007, Aragon et al.
U.S. Appl. No. 12/077,051, filed Mar. 2008, Gast, Mathew S.
Puttini, R., Percher, J., Me, L., and de Sousa, R. 2004. A fully distributed IDS for MANET. In *Proceedings of the Ninth international Symposium on Computers and Communications 2004 vol. 2 (Iscc "04)*—vol. 2 (Jun. 28-Jul. 1, 2004). ISCC. IEEE Computer Society, Washington, DC, 331-338.
U.S. Appl. No. 11/326,966, filed Jan. 5, 2006, Taylor.
U.S. Appl. No. 11/330,877, filed Jan. 11, 2006, Matta.
U.S. Appl. No. 11/331,789, filed Jan. 14, 2006, Matta, et al.
U.S. Appl. No. 11/351,104, filed Feb. 8, 2006, Tiwari.
U.S. Appl. No. 11/377,859, filed Mar. 15, 2006, Harkins.
U.S. Appl. No. 11/417,830, filed May 30, 2006, Morain.
U.S. Appl. No. 11/417,993, filed May 3, 2006, Jar et al.
U.S. Appl. No. 11/437,387, filed May 19, 2006, Zeldin et al.
U.S. Appl. No. 11/437,537, filed May 19, 2006, Freund et al.
U.S. Appl. No. 11/437,538, filed May 19, 2006, Zeldin.
U.S. Appl. No. 11/437,582, filed May 19, 2006, Bugwadia et al.
U.S. Appl. No. 11/445,750, filed May 3, 2006, Matta.
U.S. Appl. No. 11/451,704, filed Jun. 12, 2006, Riley.
Acampora and Winters, IEEE Communications Magazine, 25(8):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Freret et al., Applications of Spread-Spectrum Radio to Wireless Terminal Communications, Conf. Record, Nat'l Telecom. Conf., Nov. 30-Dec. 4, 1980.
Fortune et al., IEEE Computational Science and Engineering, "Wise Design of Indoor Wireless Systems: Practical Computation and Optimization", p. 58-68 (1995).
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 802.11b (1999).
Okamoto and Xu, IEEE, Proceeding so of the 13th Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, 1977, pp. 45-50.

Piazzi et al., "Achievable Accuracy of Site-Specific Path-Loss Predictions in Residential Environments", IEEE Transactions on Vehicular Technology, vol. 48, No. 3, May 1999.

Seidel et al., "Site-Specific Propagation Prediction for Wireless In-Building Personal Communications System Design", IEEE Transactions on Vehicular Technology, vol. 43, No. 4, Nov. 1994.

Skidmore et al., "Interactive Coverage Region and System Design Simulation for Wireless Communication Systems in Multi-floored Indoor Environments, SMT Plus" IEEE ICUPC '96 Proceedings (1996).

Ullmo et al., "Wireless Propagation in Buildings: A Statistic Scattering Approach", IEEE Transactions on Vehicular Technology, vol. 48, No. 3, May 1999.

* cited by examiner

WIRELESS VLAN SYSTEM AND METHOD

BACKGROUND

The field relates to communications networks in which subnetworks are employed.

If the number of users of a network is very large, the performance may be degraded by broadcast traffic, such as ARP and DHCP requests. Each device on the network generates a certain amount of broadcast traffic, which every other device must receive and examine to at least some degree, whereby the burden of broadcast processing rises as the square of the number of devices on the network. The degradation due to this effect can become significant even when the network traffic is well within the capacity of the physical transmission medium.

A common solution, described by Mogul and Postel (RFC 950, which is incorporated by reference) is to divide the network into subnets. Subnets can be implemented physically by using separate local-area networks (LANs), or logically by partitioning into virtual LANs (VLANs) as in IEEE 801.1Q, or by a combination of the two techniques. Any particular user's impact is then limited to the specific subnetwork to which the user is assigned. However, in the context of administering a large network, this solution still poses problems, related to the method of assigning users to subnets.

A simple method would be to use the same technique for wireless users as has historically been used for wired users, namely, determining the subnet from the physical location or port through which the user accesses the network. A known disadvantage of this method is that a mobile user who moves across a subnet boundary will lose connectivity at the network layer (Layer 3 of the OSI model). This method may therefore not be optimal for applications that require continuous connectivity while a user moves, e.g. IP telephones. Even if the user is not in motion, location-based subnet assignment may not be optimal if the user is close to a boundary between two wireless coverage areas that use different subnets, because fluctuations in the radio signal could cause the user's equipment to alternate between the coverage areas, losing connectivity each time.

Although location-based subnet assignment can (with the above-noted disadvantages) accomplish one purpose of subnets by reducing the number of users per subnet, it thwarts another important purpose of subnets, namely the separation of traffic by access privilege.

An alternative to location-based subnet assignment is to base the subnet assignment on the user's identity. Identity-based VLAN assignment is implemented in current products from, e.g., Trapeze Networks. The user's VLAN assignment is considered to be an authorization attribute of the user, and so an administrator configures it as part of the user's AAA information in an AAA server, which is typically a Radius server. This administrative effort is justified, and identity-based authorization is especially advantageous, if there is a managerial or security motivation for placing particular users into particular subnets. However, if the number of users is so large as to motivate dividing the network into subnetworks, then the administrative burden of assigning a subnet to each user will also be proportionately large.

RFC 2904 due to Vollbrecht, et al., which is incorporated herein by reference, shows frameworks for authorization in the typical context of AAA (Authentication, Authorization, and Accounting) for a network. This authorization framework is applicable to wireless or wired users. However, in the case of wireless users, the operations described in RFC 2904 must be preceded by other operations specific to establishing a wireless connection. For instance, in 802.11 wireless networks, these preliminary operations include an 802.11 association request from the wireless client device, identifying the client device by hardware (MAC) address. Typically the user's name, password, and/or other AAA parameters are exchanged after the association request has been accepted.

The 802.11 association request also includes a Service Set ID (SSID) that names a wireless service to which the client wishes to connect. If the service equipment supports multiple subnets or VLANs, a common (although not mandatory) implementation choice is to identify an SSID with each VLAN. In that method, the user's request to associate through a given SSID implies that the subsequent authorization processing should connect the user to the VLAN corresponding to that SSID. In that case there is no explicit authorization request from the user, although again, authorization parameters can be obtained from the AAA server as a side effect of authentication.

These and other issues are addressed, resolved, and/or ameliorated using techniques described herein.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for resource assignment involves obtaining a group of resources, repeatedly selecting a resource from the group of resources until a resource that is available is selected, and associating a client or process with that resource. An example of a method according to the technique includes obtaining a group of VLANs for assignment to a client based on client identity, selecting a first choice from the group of VLANs, selecting a next choice from the group of VLANs if the first choice is unavailable, and connecting the client to the selected VLAN. In this example, the resources are VLANs and the client or process is a client. The client identity may include, by way of example but not limitation, a MAC address, an SSID, or some other known or convenient way to identify the client. A specific example of a method for selecting and assigning resources may include, for example, calculating a hash function based on a client or process identity parameter.

A system constructed according to the technique may include, by way of example but not limitation, memory, a resource group name decoder, a value calculator, an index calculator, and a selector. The memory may include, for example, a resource name buffer, an identity buffer, a result buffer, a resource count buffer, a resource name array, and a selected resource buffer. In operation, the system may employ one or more processors such that an encoded resource name is stored in the resource name buffer; an identity parameter is stored in the identity buffer; the resource group name decoder reads the encoded resource name, decodes the name to obtain decoded list elements, writes a count of the list elements to the resource count buffer, and writes the decoded list elements to the resource name array; the value calculator processes the identity parameter stored in the identity buffer to produce a value that is stored in the result buffer; the index calculator takes the value stored in the result buffer modulo the count of the list elements stored in the resource count buffer; the selector uses the result of the index calculator as an array index to select a resource name from the resource name array and stores the resource name in the selected resource buffer; and a client or process is associated with the resource identified in the selected resource buffer.

The resource name buffer of the system may or may not store a VLAN name. The identity buffer may or may not store a MAC address. The value calculator may or may not process the identity parameter stored in the identity buffer to produce an integer. The value calculator may or may not include a hash calculator.

BRIEF DESCRIPTION OF THE DRAWINGS

Embodiments of the present invention are illustrated in the figures. However, the embodiments and figures are illustrative rather than limiting; they provide examples of the invention.

The foregoing examples of the related art and limitations related therewith are intended to be illustrative and not exclusive. Other limitations of the related art will become apparent to those of skill in the art upon a reading of the specification and a study of the drawings.

DETAILED DESCRIPTION

In the following description, for the purposes of explanation, numerous specific details are set forth in order to provide a thorough understanding of the present invention. It will be apparent, however, to one skilled in the art that the present invention may be practiced without one or more of these specific details or in combination with other components or process steps. In other instances, well-known structures and devices are shown in block diagram form in order to avoid unnecessarily obscuring the present invention.

Figure 1:
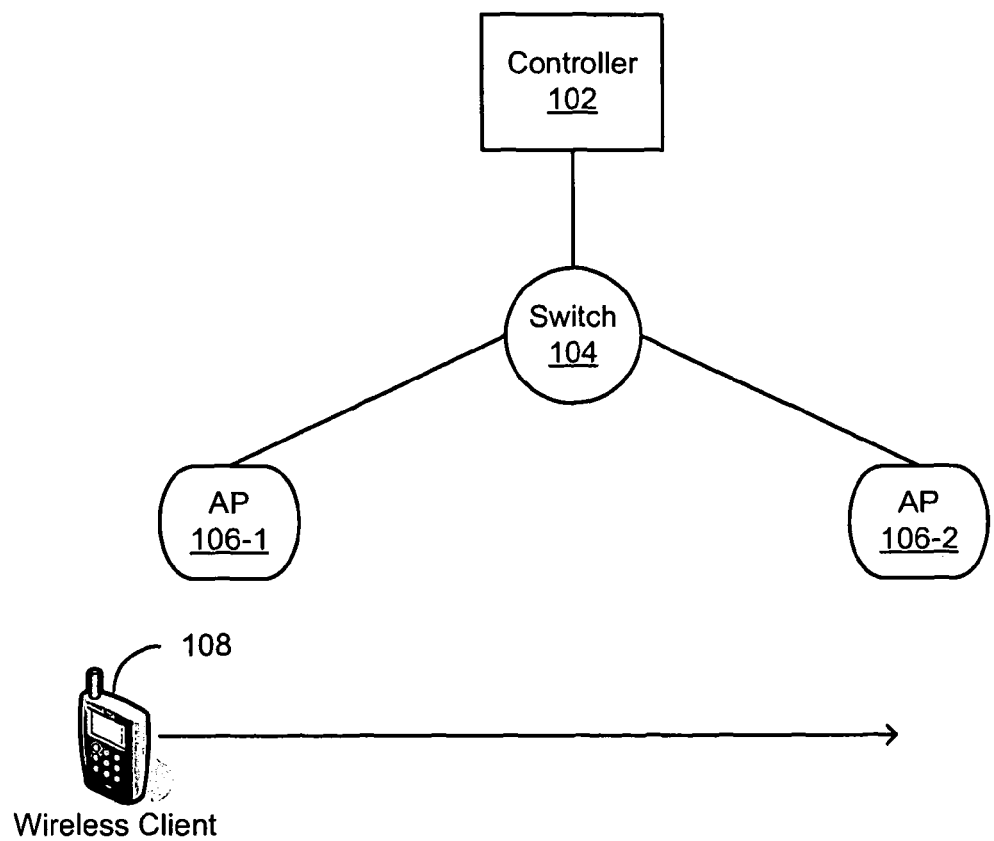
FIG. 1 depicts an example of a system for persistent VLAN association.

FIG. 1 depicts an example of a system 100 for persistent VLAN association. The system 100 includes a controller 102, a switch 104, access points (APs) 106-1 and 106-2 (referred to collectively as access points 106), and a wireless client 108. For illustrative purposes, the wireless client 108 is depicted as moving from AP 106-1 to AP 106-2. The system 100 may include by way of example but not limitation wireless LAN (WLAN) intelligence distributed in a known or convenient manner to efficiently use network resources. The intelligence may extend to the edge of a network for authentication, authorization, and traffic prioritization. The controller 102 may provide, for example, centralized management of tunnel set up between APs on an as needed basis. In an embodiment, the system 100 eliminates or reduces bottlenecks caused by tunneling all traffic through a central controller.

In the example of FIG. 1, the controller 102 is a device distinct from an AP and is coupled to and capable of controlling multiple APs. The controller 102 may be a network controller, or include one or more network controllers. The controller 102 may be, by way of example but not limitation, a network switch such as a Trapeze Mobility Exchange™ switch. Thus, for example, the controller 102 and the switch 104 could include common components, or could be a single physical or logical device.

In operation, the controller 102 controls the APs 106 to make the wireless client 108 appear as though it never leaves a VLAN, even if the wireless client 108 roams to an AP that is not in some way connected to that VLAN. The wireless client may be, by way of example but not limitation, a Wi-Fi client. Advantageously, the wireless client 108 can roam across VLANs potentially without interruption. In an embodiment, highly latency sensitive applications such as Voice over Wi-Fi calls seamlessly roam across VLANs.

The controller 102 keeps track of which clients are associated with each AP and shares that information with the APs 106 to enable them to set up tunnels between each other as required to enable VLAN roaming. In the example of FIG. 1, the wireless client 108 is associated with the AP 106-1. When the wireless client 108 associates to the AP 106-2, the AP 106-2 tells the controller 102 about the association. If the VLAN to which the wireless client was connected before it roamed is not available to the AP 106-2, then the controller 102 instructs the AP 106-2 and AP 106-1 to establish a tunnel 110 between each other. In an embodiment, all traffic to the wireless client 108 would be sent across the tunnel 110 from the AP 106-1 to the AP 106-2, and all traffic from the wireless client 108 would be tunneled from the AP 106-2 to the AP 106-1.

Advantageously, the system 100 can extend an existing network. For example, APs can be deployed where desired without rearchitecting the network (e.g., an existing Ethernet network). This can potentially eliminate complicated VLAN configuration, provide scalability from branch offices to large enterprises, facilitate maintaining investment in existing layer 2/3 switches, upgrade existing WLAN installations, etc.

Figure 2:
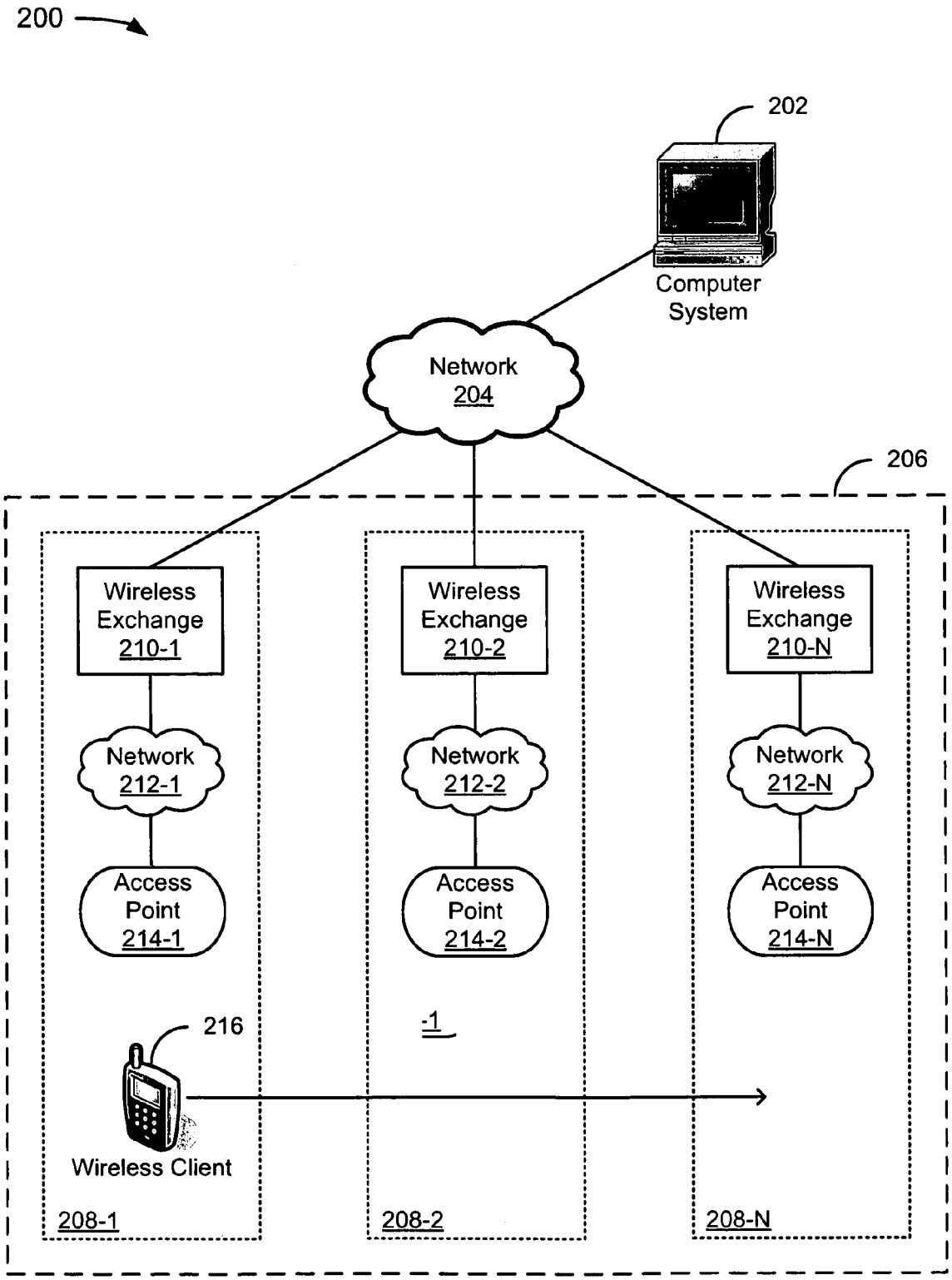
FIG. 2 depicts an example of a system for persistent VLAN association across domains.

FIG. 2 depicts an example of a system 200 for persistent VLAN association across wireless access areas. The system 200 includes a computer system 202, a network 204, and a wireless access domain 206. The system 200 may or may not include multiple wireless access domains. In an embodiment that includes multiple wireless access domains, techniques that will be apparent to those of skill in the art with this reference before them, can be used to ensure persistent VLAN association across the wireless access domains.

In the example of FIG. 2, the computer system 202 may be practically any type of device that is capable of communicating with a communications network, such as, by way of example but not limitation, a workstation. The network 204 may be practically any type of communications network, such as, by way of example but not limitation, the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

In a non-limiting embodiment, the computer system 202 may be running a program such as, by way of example but not limitation, ethereal, to decode, by way of example but not limitation, IEEE 802.11 standard packets encapsulated in TZSP that are received from the wireless access domain 106. In a non-limiting embodiment, the computer system 102 is connected to a wireless backbone network (not shown), either directly or indirectly through a wireless network.

In a non-limiting embodiment, the network 204 provides a Layer 2 path for Layer 3 traffic, preserving IP addresses, sessions, and other wired Layer 3 attributes as users roam throughout the wireless access domain 106. The network may or may not include a wireless backbone network, or be connected directly or indirectly to a wireless backbone network. Communications between the computer system 202 and the wireless access domain 206 are, therefore, Layer 3 traffic tunneled through Layer 2. Advantageously, by tunneling Layer 3 traffic at Layer 2, users stay connected with the same IP address and keep the same security and Quality of Service (QoS) policies from the wired network while they roam the wireless side. Since Layer 3 attributes are maintained, mobile devices that are connected to the wireless access domain 206 can retain persistent identities.

The seven layers of the Open System Interconnection (OSI) model, of which Layers 2 and 3 are a part, are well-known to those of skill in the relevant art, and are, therefore, not described herein in any substantial detail. It should be noted, however, that Layer 3 is known as the "Network Layer" because it provides switching and routing technologies, creating logical paths, known as virtual circuits, for transmitting data from node to node. Routing and forwarding are functions of this layer, as well as addressing, internetworking, error handling, congestion control and packet sequencing. Layer 2 is known as the "Data Link Layer" because at Layer 2 data packets are encoded and decoded into bits; and Layer 2 furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control, and error checking.

In non-limiting embodiments, the wireless access domain 206 may be referred to as, by way of example but not limitation, a Local Area Network (LAN), virtual LAN (VLAN), and/or wireless LAN (WLAN). The wireless access domain 206 gives each user a persistent identity that can be tracked and managed, no matter where they roam. In an embodiment, the wireless access domain 206 may include one or more radios.

In the example of FIG. 2, the wireless access domain 206 includes access areas 208-1 to 208-N (hereinafter collectively referred to as access areas 208). The access areas 208 have characteristics that depend upon, among other things, a radio profile. A radio profile is a group of parameters such as, by way of example but not limitation, beacon interval, fragmentation threshold, and security policies. In an embodiment, the parameters may be configurable in common across a set of radios in one or more access areas 208. In another embodiment, a few parameters, such as the radio name and channel number, must be set separately for each radio. An example of the implementation of a wireless access domain, provided by way of example but not limitation, includes a Trapeze Networks "identity-aware" Mobility Domain™.

In the example of FIG. 2, the following elements are associated with each of the access areas 208: Wireless exchange switches 210-1 to 210-N (hereinafter collectively referred to as wireless exchange switches 210), networks 212-1 to 212-N (hereinafter collectively referred to as networks 212), and APs 214-1 to 214-N (hereinafter collectively referred to as APs 214).

In an embodiment, the wireless exchange switches 210 swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown). RFC 2904 "AAA Authorization Framework" by Vollbrecht et al. is incorporated herein by reference. In an embodiment, the wireless exchange switches 210 provide forwarding, queuing, tunneling, and/or some security services for the information the wireless exchange switches 210 receive from their associated APs 214. In another embodiment, the wireless exchange switches 210 coordinate, provide power to, and/or manage the configuration of the associated APs 214. An implementation of a wireless exchange switch, provided by way of example but not limitation, includes a Trapeze Networks Mobility Exchange™ switch. The Trapeze Networks Mobility Exchange™ switches may, in another implementation, be coordinated by means of the Trapeze AP Access (TAPA) protocol.

In an embodiment, the networks 212 are simply wired connections from the wireless exchange switches 210 to the APs 214. The networks 212 may or may not be part of a larger network. In a non-limiting embodiment, the networks 212 provides a Layer 2 path for Layer 3 traffic, preserving IP addresses, sessions, and other wired Layer 3 attributes as users roam throughout the wireless access domain 206. Advantageously, by tunneling Layer 3 traffic at Layer 2, users stay connected with the same IP address and keep the same security and Quality of Service (QoS) policies from the wired network while they roam the wireless side.

In a non-limiting embodiment, the APs 214 are hardware units that act as a communication hub by linking wireless mobile 802.11 stations such as PCs to a wired backbone network. In an embodiment, the APs 214 connect users to other users within the network and, in another embodiment, can serve as the point of interconnection between a WLAN and a fixed wire network. The number of users and size of a network help to determine how many APs are desirable for a given implementation. An implementation of an AP, provided by way of example but not limitation, includes a Trapeze Networks Mobility System™ Mobility Point™ (MP™) AP.

The APs 214 are stations that transmit and receive data (and may therefore be referred to as transceivers) using one or more radio transmitters. For example, an AP may have two associated radios, one which is configured for IEEE 802.11a standard transmissions, and the other which is configured for IEEE 802.11b standard transmissions. In a non-limiting embodiment, an AP transmits and receives information as radio frequency (RF) signals to and from a wireless client over a 10/100BASE-T Ethernet connection. The APs 214 transmit and receive information to and from their associated wireless exchange switches 210. Connection to a second wireless exchange switch provides redundancy.

A station, as used herein, may be referred to as a device with a media access control (MAC) address and a physical layer (PHY) interface to the wireless medium that comply with the IEEE 802.11 standard. As such, in a non-limiting embodiment, the APs 214 are stations. Similarly, the wireless client 216 may be implemented as a station. In alternative embodiments, a station may comply with a different standard than IEEE 802.11, and may have different interfaces to a wireless or other medium.

In operation, a wireless client 216 can roam from one of the access areas 208 to another of the access areas 208. For example, in the example of FIG. 1 the wireless client 216 moves from the access area 208-1 to the access area 208-N. In an embodiment, the wireless client 216 can maintain a single IP address and associated data sessions. The ability of the wireless client 216 to roam across the access areas 208 while maintaining a single IP address and associated data sessions may be referred to as subnet mobility. The ability of the wireless client 216 to roam across the access areas 208, or from one AP to another within a particular access area (see, e.g., FIG. 1), while appearing to remain associated with a particular VLAN may be referred to persistent VLAN association. Advantageously, the system 200 may be implemented using identity-based networking, which is a technique that enforces network authorization attributes to the wireless client 216 based on client identity rather than the port or device through which the wireless client 216 connects to the network. This technique enables both a single persistent login and passport free roaming which permits the introduction of services such as voice to a WLAN.

Figure 3:
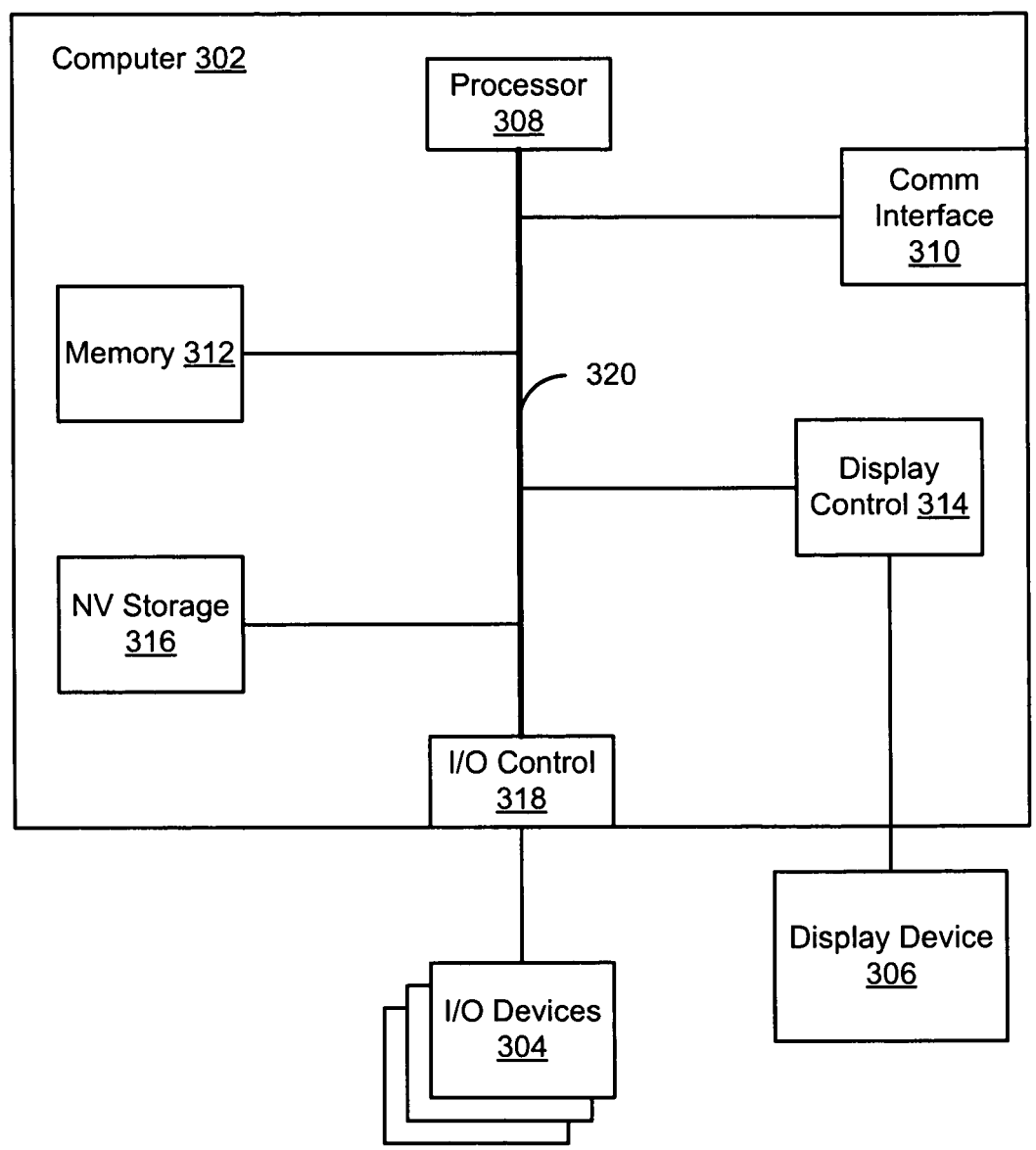
FIG. 3 depicts an example of a computer system for use in the system of FIG. 2.

FIG. 3 depicts an example of a computer system 300 for use in the system 200 (FIG. 2). The computer system 300 may be a conventional computer system that can be used as a client computer system, such as a wireless client or a workstation, or a server computer system. The computer system 300 includes a computer 302, I/O devices 304, and a display device 306. The computer 302 includes a processor 308, a communications interface 310, memory 312, display controller 314, non-volatile storage 316, and I/O controller 318. The computer 302 may be coupled to or include the I/O devices 304 and display device 306.

The computer 302 interfaces to external systems through the communications interface 310, which may include a modem or network interface. It will be appreciated that the communications interface 310 can be considered to be part of the computer system 300 or a part of the computer 302. The communications interface 310 can be an analog modem, ISDN modem, cable modem, token ring interface, satellite transmission interface (e.g. "direct PC"), or other interfaces for coupling a computer system to other computer systems.

The processor 308 may be, for example, a conventional microprocessor such as an Intel Pentium microprocessor or Motorola power PC microprocessor. The memory 312 is coupled to the processor 308 by a bus 320. The memory 312 can be Dynamic Random Access Memory (DRAM) and can also include Static RAM (SRAM). The bus 320 couples the processor 308 to the memory 312, also to the non-volatile storage 316, to the display controller 314, and to the I/O controller 318.

The I/O devices 304 can include a keyboard, disk drives, printers, a scanner, and other input and output devices, including a mouse or other pointing device. The display controller 314 may control in the conventional manner a display on the display device 306, which can be, for example, a cathode ray tube (CRT) or liquid crystal display (LCD). The display controller 314 and the I/O controller 318 can be implemented with conventional well known technology.

The non-volatile storage 316 is often a magnetic hard disk, an optical disk, or another form of storage for large amounts of data. Some of this data is often written, by a direct memory access process, into memory 312 during execution of software in the computer 302. One of skill in the art will immediately recognize that the terms "machine-readable medium" or "computer-readable medium" includes any type of storage device that is accessible by the processor 208 and also encompasses a carrier wave that encodes a data signal.

The computer system 300 is one example of many possible computer systems which have different architectures. For example, personal computers based on an Intel microprocessor often have multiple buses, one of which can be an I/O bus for the peripherals and one that directly connects the processor 308 and the memory 312 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 312 for execution by the processor 308. A Web TV system, which is known in the art, is also considered to be a computer system, but it may lack some of the features shown in FIG. 3, such as certain input or output devices. A typical computer system will usually include at least a processor, memory, and a bus coupling the memory to the processor.

In addition, the computer system 300 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 316 and causes the processor 308 to execute the various acts required by the operating system to input and output data and to store data in memory, including storing files on the non-volatile storage 316.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention may also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 4:
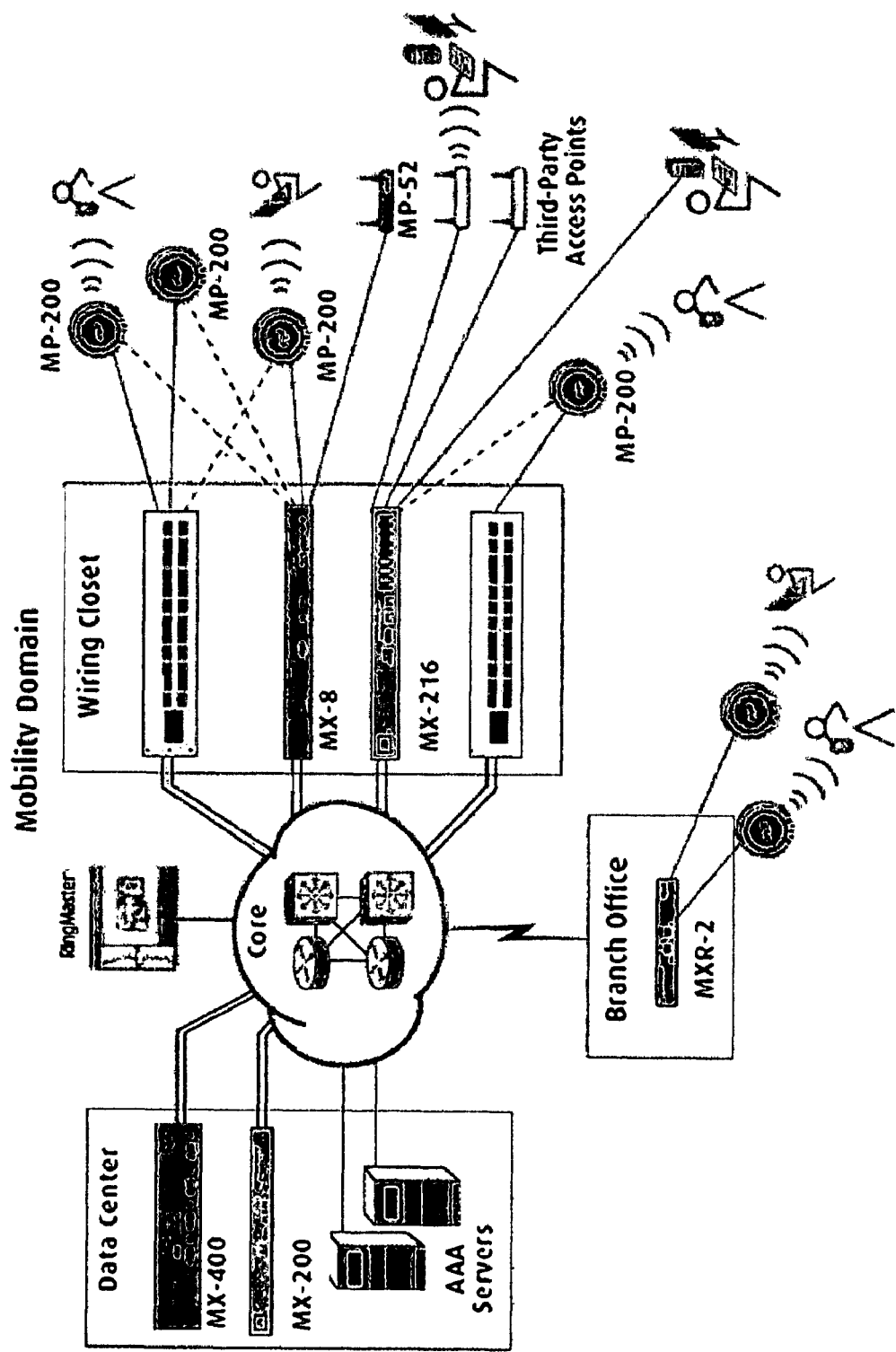
FIG. 4 depicts a specific implementation of a system 400 compatible with the techniques described herein.

FIG. 4 depicts a specific implementation of a system 400 compatible with the techniques described herein. It should be noted that the system 400 may or may not include all of the techniques described herein, and is not to be interpreted as "the invention." The system 400 is intended to serve as a non-limiting example of a specific implementation that is useful for understanding one or more of the disclosed techniques.

Enterprise networks that deploy, for example, a Trapeze Mobility System™ might use several Mobility Exchanges™ (MXs™) to deliver WLAN service in areas where mobility is required. In the example of FIG. 4, the deployed MXs include an MX-16, MX-200, MX-216, and MX-400. Currently, MXs are available in a variety of form factors the MXR-2, MX-8, MX-200, MX-216 and MX-400, each of which is compatible with Identity-Based Networking, multiple users per port, multiple private groups per MX, and AAA offload. MXs may implement an IEEE 802.1X protocol to authenticate users and control access to a network. In the example of FIG. 4, the MXs are installed in a wiring closet and a data center, though this is not intended to be a limitation as to the placement of the MX(s). The MXs that form the Mobility Domain authenticate each user and enforce their network authorizations wherever they roam. These network authorizations include the user's VLAN membership, ACLs, and Mobility Profiles that were learned from AAA during the authentication process. In addition, the Mobility Domain moves statistics, session history, and security-related information to hosting MXs as the user moves through the Mobility Domain.

These MXs communicate with each other and with Trapeze Mobility Points™ (MPs™) to create a Mobility Domain™ and deliver Identity-Based Networking. Identity-Based Networking provides user-specific services based on a user's identity. MXs also control MPs and APs, configuring and managing them whether the MXs directly link to them or use the existing wired infrastructure to connect to them. In the example of FIG. 4, the depicted MPs include a MP-52 and MP-200. The example of FIG. 4 also depicts a plurality of third party APs. It should be noted that the term AP may be used generally to include both MPs and third party APs.

In a specific implementation provided by way of example but not limitation, Trapeze Mobility System Software™ may be used with the system 400 to allow any port on an MX to be configured as either a "network" or "user" port. Network ports connect to the network backbone. User ports permit authenticated network access on a per-user basis. Network ports are roughly analogous to the "trusted" ports of a firewall or access server while the user ports are roughly analogous to a firewall's "untrusted" ports. Network ports determine the VLANs that are locally available to users connected to a particular MX. In this specific implementation, user ports are further categorized by access medium to include users with a wired connection and users who connect through a MP attached to a port.

In operation, the username and password that the user enters to log into the network (including by way of example but not limitation, NT Domain, Active Directory, etc.) is used by the MX to authenticate the user against an AAA back-end. Remote access dial-in user service (RADIUS) is currently a common type of AAA server. In the example of FIG. 4, the AAA server is located at the data center, though this is not intended to be a limitation as to the placement of the AAA server. During the authentication process, the system learns a user's network authorization attributes. User network authorization attributes may include VLAN membership, ACLs, and Mobility Profiles which may limit where the user is allowed to roam.

When users roam, they will associate with an AP that is attached to a different port on a different switch and router subnet. For this reason, in this specific implementation, permissions should follow users on a WLAN network as they roam. When the user authenticates to or roams to an AP, the hosting MX learns which VLAN to put the user on based on their identity and authorizations in the AAA server. If the network port of the MX is directly connected to the user's VLAN, for example through its gigabit port(s), the user is joined to it automatically. If the network ports of the MX are not directly connected to that VLAN, then the user has just roamed across a subnet boundary.

Figure 5:
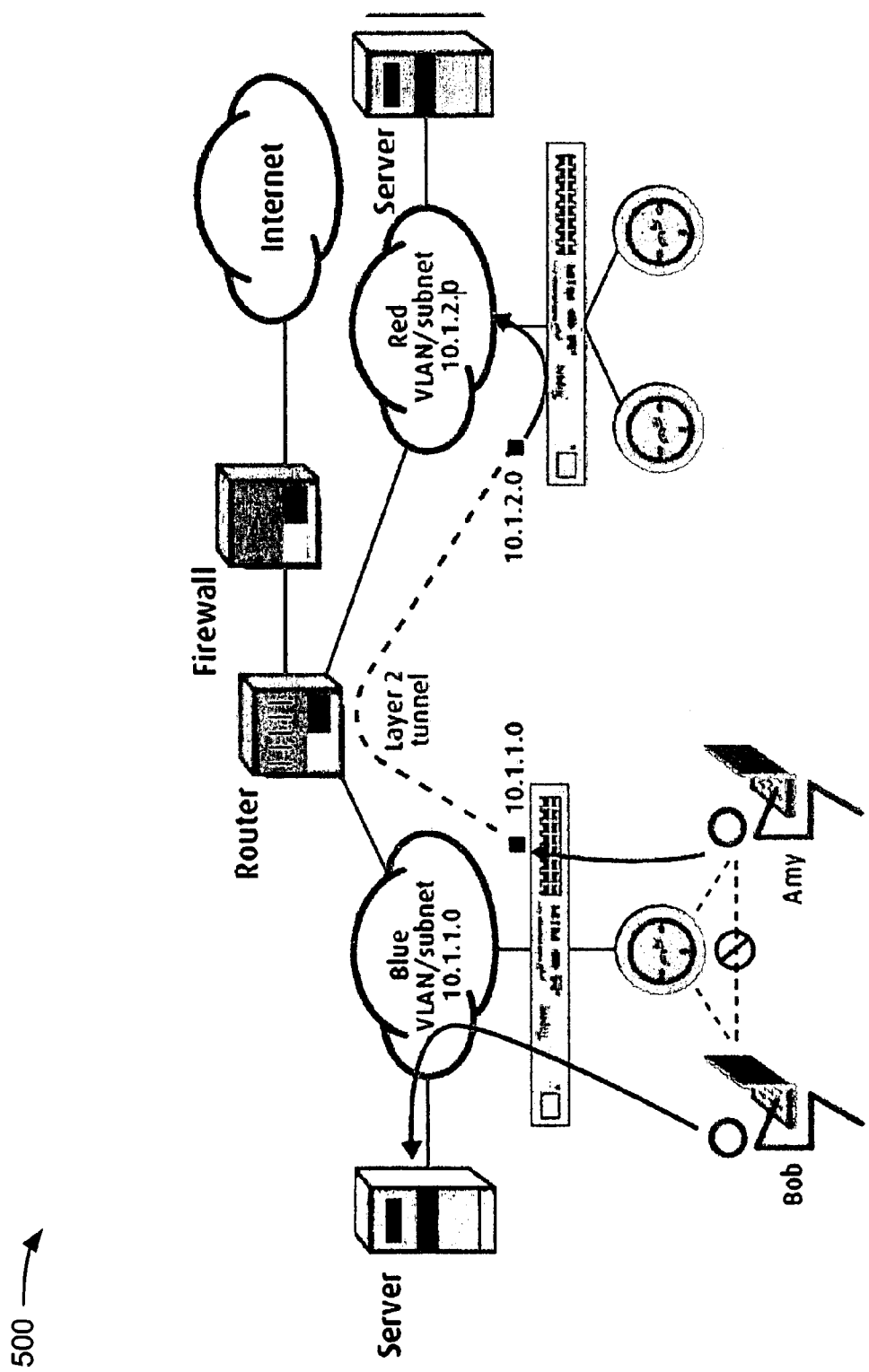
FIG. 5 depicts an example of subnet roaming.

FIG. 5 depicts an example of subnet roaming in a system 500. Subnet roaming occurs when the user roams to an AP hosted by a MX whose network port is not directly connected to the user's VLAN. The Trapeze Mobility System supports subnet roaming with Identity-Based Networking. Identity-Based Networking allows the Trapeze Mobility System to enforce network authorizations based on the user's identity even when they roam across subnets. FIG. 5 is intended to show how Identity-Based Networking leverages Layer 2 VLAN technology to support subnet roaming.

In the example of FIG. 5, Amy is a member of the "red" VLAN and roams to an AP hosted by a MX whose network port is directly connected to the "blue" VLAN and not the red VLAN. The hosting MX attached to the blue VLAN will automatically search its local Mobility Domain database of MXs to find an MX whose network port is directly attached to the red VLAN. Once it is found, the MX hosting the roaming client forms an IP tunnel to the MX hosting "red." If multiple MXs are hosting red, a 'tunnel affinity' parameter can be used to influence choice.

It may be noted that the client configuration of Amy and Bob in the example of FIG. 5 could be identical. One consideration for deploying large WLAN systems is to minimize or eliminate configuration elements and differences on client devices. Advantageously, in an embodiment, the system 400 allows for the presentation of a single 802.11 service set identifier (SSID) to all wireless users, regardless of their 802.1X/EAP type, their VLAN membership, or other authorization credentials. The client machine sees only one SSID throughout the enterprise. Users are authenticated, then authorized and connected to various VLANs or subnets all using the same SSID.

By using a single SSID, the client is configured only once and all clients are configured the same way. SSIDs are not a determinant of security credentials or network capabilities—only the AAA process is. It is still possible to join the subnet or VLAN of interest and to restrict roaming capabilities based on physical location. The management task of managing an array of SSIDs on the clients and in the network can be eliminated.

In the example of FIG. 5, to the rest of the network, including intervening switches and routers, the tunnel looks like simple IP unicast traffic between two MXs. The user's traffic that is carried in the tunnel between the MXs is not required to be IP traffic. It is a Layer 2 tunnel from the MX on the blue VLAN to the MX on the red VLAN. The tunnel is equivalent to putting an additional user onto an unused port of a switch that is part of the red VLAN.

Advantageously, no new subnets need to be added to the network to implement the system 500. If you are currently a user of the red subnet, you can remain a user of the red subnet. Any ACLs that you have currently implemented remain effective. If there are firewalls or highly restrictive ACLs between subnets, the only impact to network configuration is to allow the MXs (not clients) to exchange data. The firewalls still remain effective for user data.

Advantageously, the Layer 2 approach combined with tunneling scales extensively. For instance, in the example of FIG. 5: If additional users of the red VLAN roam to the MX that is attached to the blue VLAN, their traffic also traverse the existing tunnel that was initially setup for Amy rather than creating a new tunnel for each roaming user. If Amy and those same additional users send traffic to each other, that traffic is switched locally on the MX attached to the blue VLAN rather than being transmitted across the tunnel. Logically, the red VLAN is instantiated on the MX that is connected to the blue VLAN.

Advantageously, an existing tunnel can be used for any number of users or subnets in any direction. For instance, in the example of FIG. 5: If users of the blue VLAN roam to the MX that is attached to the red VLAN, their traffic is tunneled back to the MX on the blue VLAN through the existing tunnel that was setup for Amy. If the MX that attaches to the red VLAN is also attached to a "green" VLAN (not shown), then the one tunnel will carry traffic from users who roam to the MX attached to the blue VLAN.

Tunnels are "lightweight" and there aren't very many of them in a Mobility Domain. When needed, they provide a path over which the MX can dynamically instantiate "virtual ports" for the VLANs of interest. Each MX would never have more than (N minus 1) tunnels, where N is the total number of MXs in the Mobility Domain.

For existing routers in an enterprise, an MX-to-MX connection means additional IP unicast traffic is being routed between MXs when users roam away from their native subnet. The existing routers do not participate in any tunneling overhead and they do not need to run any additional protocols such as Mobile IP. In fact, in an embodiment, no additional router configuration is necessary.

The additional routed traffic can be weighed against the cost and difficulty of extending subnets to new areas—the difficulty depends entirely upon the enterprise backbone architecture. To assist in this analysis, the Trapeze Mobility System Software provides extensive information on tunnel usage including traffic statistics, what VLANs are being used and what users are utilizing them.

Figure 6:
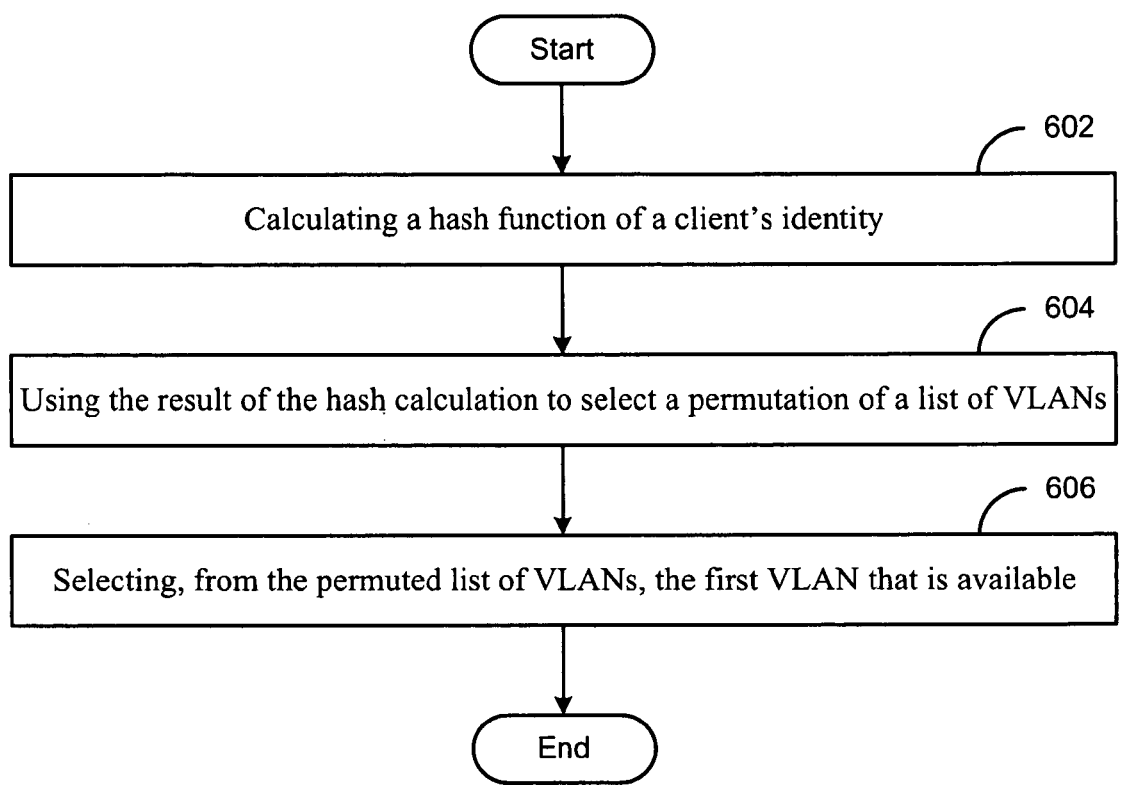
FIG. 6 depicts a flowchart of an example of a method for assigning wireless clients to subnetworks.

FIG. 6 depicts a flowchart 600 of an example of a method for assigning wireless clients to subnetworks. FIG. 6 is intended to illustrate an example of how to assign clients to subnetworks, but it is to be understood that other methods may be utilized and fall within the scope of the teachings provided herein. Advantageously, the method facilitates assigning a large number of users in a balanced manner among several subnetworks such that a given user will consistently be assigned to the same subnetwork and thus will maintain connectivity when roaming, yet does not require administrators to assign a subnetwork to each user. An additional advantage is that should a subnetwork be unavailable (e.g., malfunctioning), its users will be re-assigned in a balanced and consistent manner among the remaining networks. An additional advantage of the method is to reduce administrative effort of specifying subnet assignments by providing for automatic calculation. An additional advantage of the method is to provide improved fault tolerance by systematically generating fallback assignments if a subnet is found to be unusable.

In the example of FIG. 6, the flowchart 600 starts with calculating a hash function of a client's identity. An example of a hash function is described later with reference to FIGS. 10 and 11, but a known or convenient hash function may be used instead. In the example of FIG. 6, the flowchart 600 continues with using the result of the hash calculation to select a permutation of the list of VLANs. In the example of FIG. 6, the flowchart 600 ends with selecting, from the permuted list of VLANs, the first VLAN that is available.

Figure 7:
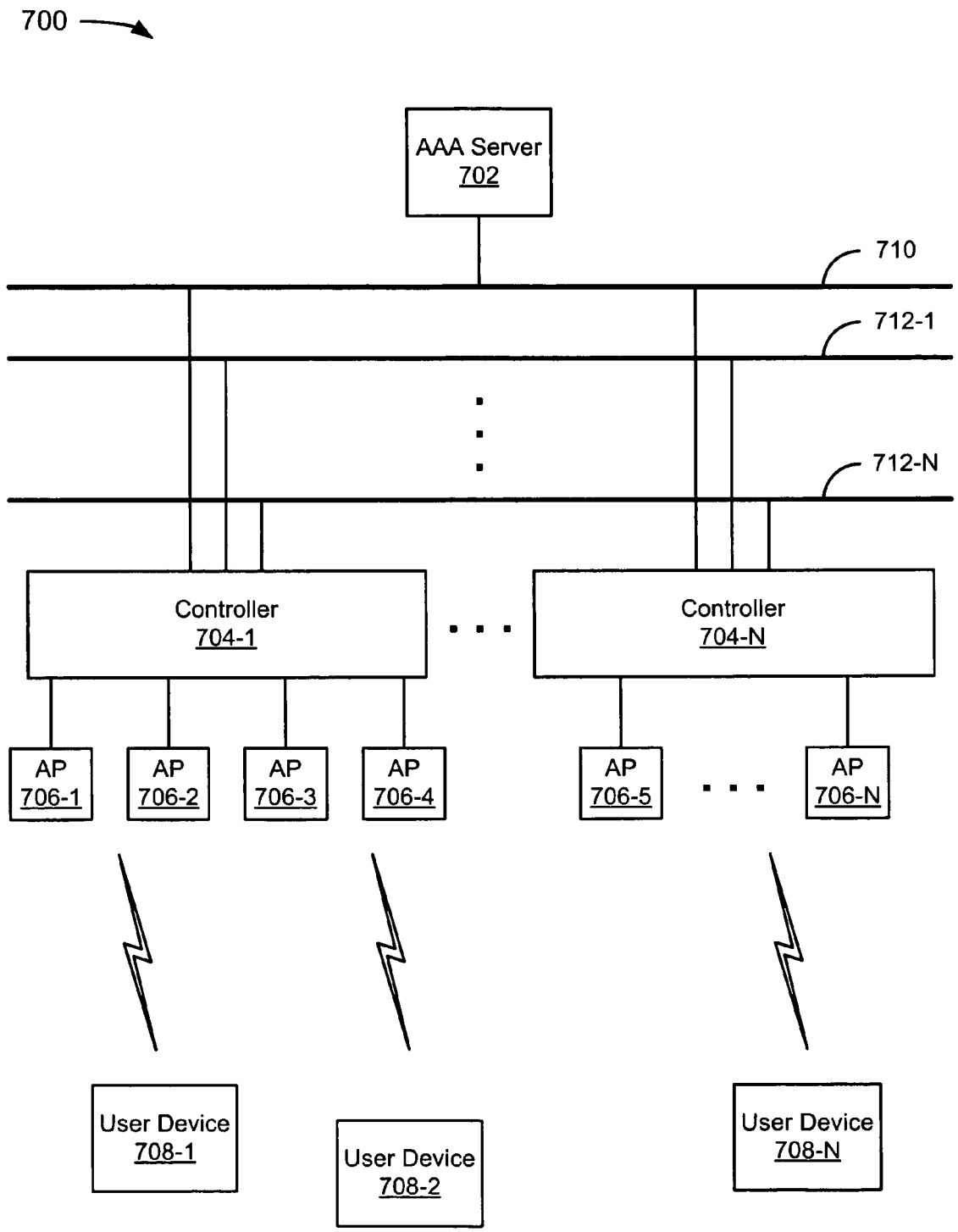
FIG. 7 depicts an example of a system that includes multiple controllers.

FIG. 7 depicts an example of a system 700 that includes multiple controllers. The system 700 includes an AAA server 702, controllers 704-1 to 704-N (hereinafter referred to collectively as the controllers 704), APs 706-1 to 706-N (collectively referred to hereinafter as the APs 706), and user devices 708-1 to 708-N (collectively referred to hereinafter as the user devices 708). The system 700 further includes a management LAN 710, and a plurality of other LANs 712-1 to 712-N (collectively referred to hereinafter as the LANs 712). For illustrative purposes only, the management LAN 710 and the LANs 712 are depicted as busses.

In the example of FIG. 7, the AAA server 702 is coupled to the management LAN 710. The controllers 704 are coupled to the management LAN 710 and the LANs 712. The APs 706 are coupled to the controllers 704. For illustrative purposes only, APs 706-1 to 706-4 are depicted as coupled to the controller 704-1, and the APs 706-5 to 706-N are depicted as coupled to the controller 704-N. The user devices 708 are wirelessly coupled to the APs 706. In an embodiment, the user devices 708 do not have access to the management LAN 710. The management LAN 710 may be, for example, for facilitating operation and configuration of the controllers 704 by, for example, an administrator. Moreover, the management LAN 710 may facilitate communication between the controllers 704 and with the back-end AAA server 702.

In operation, the controllers 704 facilitate forwarding traffic from the user devices 708 to the LANs 712 and vice versa. User devices 708 can be portable devices equipped with, by way of example but not limitation, 802.11 interfaces. For example, user devices 708 can be portable computers or wireless VoIP telephones. The user devices 708 might associate to any of the APs 706 on the respective one of the controllers 704, or to other equivalent APs (not shown). Once having associated to an AP, a user device might roam to another AP, on the same or a different one of the controllers 704. In an embodiment, the controllers 704 include software, firmware, and/or hardware that facilitates assigning the user devices 708 to subnetworks.

The management LAN 710 and the LANs 712 may be implemented as physically separate media or as virtual networks (VLANs) or by a combination; they may be referred to herein as VLANs regardless of the specific implementation.

Figure 8:
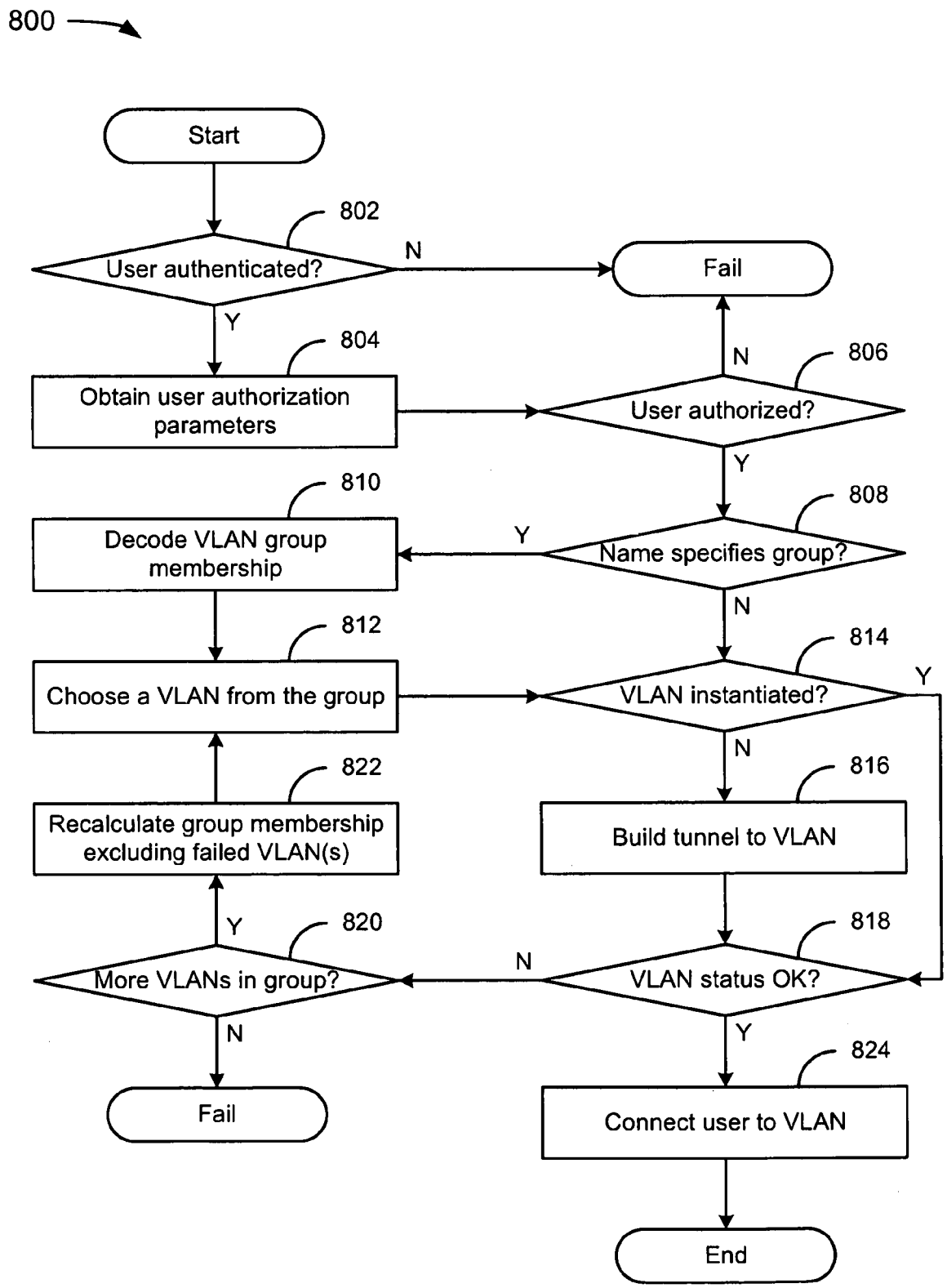
FIG. 8 depicts a flowchart of an example of a method for user authentication and association with a VLAN.

FIG. 8 depicts a flowchart 800 of an example of a method for user authentication and association with a VLAN. In the example of FIG. 8, the flowchart 800 starts at decision point 802 where it is determined whether a user can be authenticated. This may involve, by way of example but not limitation, determining and validating the user's identity. Authentication methods are well known and can be, for example, 802.1X using PEAP and MS-CHAP. In an embodiment, the identity is validated using an AAA server. In another embodiment, a list stored locally within controller can be used to authenticate the user. Alternatively, some other known or convenient validation technique may be used.

If at decision point 802, it is determined that the user cannot be authenticated (802-N), then the association fails and the flowchart 800 ends. If, on the other hand, it is determined that the user can be authenticated (802-Y), then the flowchart 800 continues to module 804 where user authorization parameters are obtained.

In the example of FIG. 8, the flowchart 800 continues to decision point 806 where it is determined whether the user is authorized. If the user is not authorized (806-N), then the association fails and the flowchart 800 ends. By way of example but not limitation, authorization may fail if the authorization attributes specify restrictions on the time of day when the user is allowed to connect, and the user is attempting to connect at a time that is not allowed. There are almost limitless reasons why authorization could fail, so an exhaustive list will not be attempted.

If, on the other hand, it is determined that the user is authorized (806-Y), then the flowchart 800 continues to decision point 808 where it is determined whether a VLAN name specifics a VLAN group. The decision may involve, by way of example but not limitation, detecting the presence of specific characters in the VLAN name attribute.

In the example of FIG. 8, if it is determined that a VLAN name specifies a VLAN group (808-Y), then the flowchart 800 continues to module 810 where VLAN group membership is decoded. By way of example but not limitation, if the VLAN attribute specifies a VLAN group, the VLAN name attribute may be parsed to make a list of individual VLANs that are members of the group. The flowchart 800 continues to module 812 where a VLAN is chosen from the group. Another example of how to decode VLAN group membership and choose a VLAN from the group, as in modules 810 and 812, is described later with reference to FIG. 10.

In the example of FIG. 8, after module 812, or if it is determined that a VLAN name does not specify a VLAN group (808-N), the flowchart 800 continues to decision point 814 where it is determined whether a VLAN is instantiated. By way of example but not limitation, a VLAN may be considered instantiated if a controller has a connection to that VLAN. The connection might be a physical port, a software tunnel, or some other known or convenient technique for forming a connection. If it is determined that a VLAN is not instantiated (814-N), then the flowchart 800 continues to module 816 where a tunnel is built to the VLAN. For example, if the controller does not already have a connection to the VLAN, but is capable of creating a software tunnel to a controller that is physically connected to the VLAN, then the software tunnel is established.

In the example of FIG. 8, after module 816, or if it is determined that a VLAN is instantiated (814-Y), the flowchart 800 continues to decision point 818, where it is determined whether VLAN status is OK. VLAN status will be OK, for example, if the VLAN specified in the authorization attributes is usable.

If it is determined that VLAN status is not OK (818-N), then the flowchart continues to decision point 820 where it is determined whether more VLANs are in the group. In an embodiment, if a VLAN that is part of a group should fail (e.g., Status is not OK), users that would ordinarily have been assigned to that VLAN are allocated evenly and deterministically among the remaining VLANs. Failure of a VLAN may be detected by any of several methods known in the art; for example, absence of carrier at a physical Ethernet port, or inability to contact a server or gateway in the VLAN, or software detection that tunnel creation has failed.

If it is determined that more VLANs are in the group (820-Y), then the flowchart continues to module 822 where VLAN group membership is recalculated excluding the failed VLAN(s), and the flowchart 800 continues from module 812 as described previously. The recalculation may include testing whether there are VLANs remaining in the group (e.g., whether a VLAN count maintained in a numeric buffer is greater than one—see, e.g., FIG. 10). The recalculation may further include deleting the failed VLAN from an array of VLANs in the group (see, e.g., FIG. 10). Advantageously, the decision point 820 and module 822 provide for a recovery path after failure, making this method relatively robust. When the flowchart 800 advances to module 812, the VLAN array will be shortened, due to the deletion of the failed VLAN, and, at least in some embodiments, the indexes should be shifted accordingly for ease of referencing the VLAN array.

If, on the other hand, it is determined that no more VLANs are in the group (820-N), then the association fails, and the flowchart 800 ends. The failure may occur, for example, after multiple iterations of the flowchart 800 from module 812 to module 822, at which point it may be assumed that VLAN status is not OK for any of the VLANs in the group.

Eventually, when a VLAN is found with a status that is OK (818-Y), the flowchart 800 continues to module 824 where the user is connected to the VLAN, and the flowchart 800 ends with a successful association.

Figure 9A:
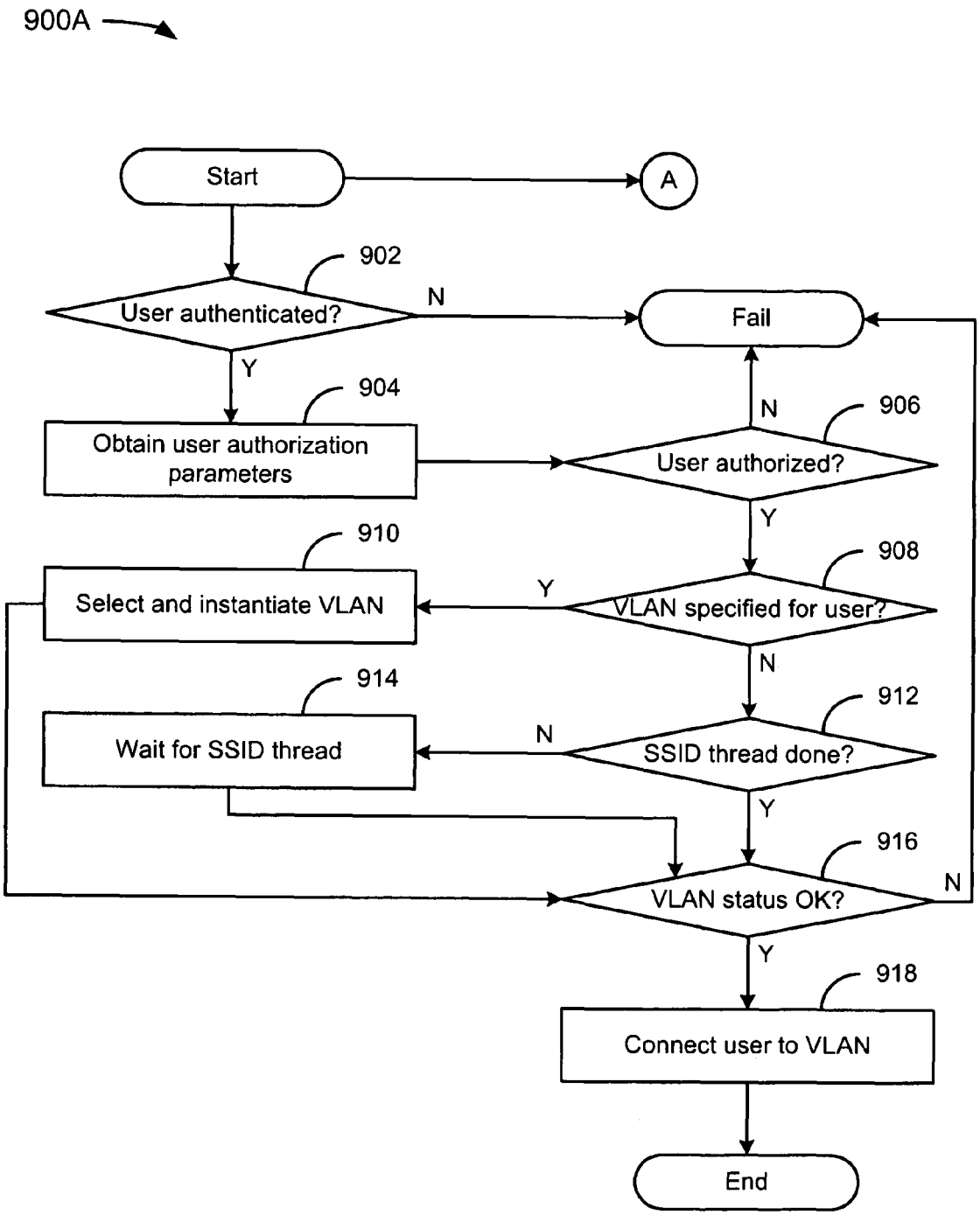
FIGS. 9A and 9B depict flowcharts of an example of an alternative method for user authentication and association with a VLAN.
Figure 9B:
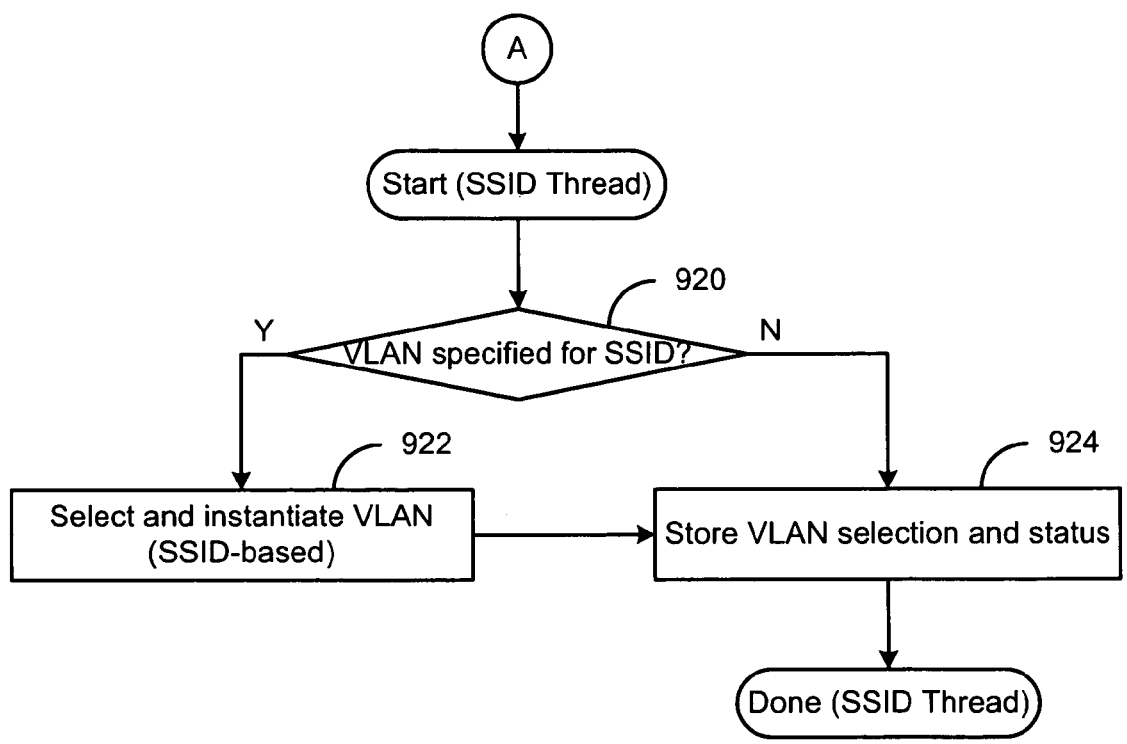

FIGS. 9A and 9B depict flowcharts 900A and 900B, respectively, of an example of an alternative method for user authentication and association with a VLAN. Several of the modules and decision points are similar to those of FIG. 8, and are therefore not described in any detail with reference to FIGS. 9A and 9B. There are two points at which the processing path illustrated in FIG. 8 may need to communicate with external servers: The AAA operations (modules 802-806), and building a VLAN tunnel (module 816). FIGS. 9A and 9B are intended to illustrate an example of a method that allows these two potential bottlenecks to execute in parallel, potentially reducing total time to connect the user to a VLAN.

The description associated with FIG. 8 accomplishes VLAN assignment based on the user's identity. However, it is also possible to configure the controller so that a VLAN group corresponds to the wireless network ID (SSID) through which the user associates. An advantage of using SSID-based VLAN groups is that the SSIDs in a network are fewer than the users, so the administrative effort to specify the VLAN assignments may be lower. FIGS. 9A and 9B are also intended to illustrate that SSID-based VLAN group assignment.

In the example of FIG. 9A, the flowchart 900A starts at decision point 902 where it is determined whether a user can be authenticated. (An SSID thread may spawn at any time at or after the flowchart 900A starts; the SSID thread is described later with reference to FIG. 9B). If at decision point 902, it is determined that the user cannot be authenticated (902-N), then the association fails and the flowchart 900A ends. If, on the other hand, it is determined that the user can be authenticated (902-Y), then the flowchart 900A continues to module 904 where user authorization parameters are obtained. In the example of FIG. 9A, the flowchart 900 continues to decision point 906 where it is determined whether the user is authorized. If the user is not authorized (906-N), then the association fails and the flowchart 900A ends.

If, on the other hand, it is determined that the user is authorized (906-Y), then the flowchart 900A continues to decision point 908 where it is determined whether a VLAN is specified for the user. In an embodiment, decision point 908 is associated with a test to determine whether the authorization parameters include an identity-based VLAN assignment. If it is determined that a VLAN is specified for the user (908-Y), then the flowchart 900A continues to module 910 where the VLAN is selected and instantiated.

If, on the other hand, it is determined that a VLAN is not specified for the user (908-N), then the flowchart 900A continues to decision point 912 where it is determined whether the SSID thread is done. For example, if it is determined that there is no identity-based VLAN parameter, then the VLAN assignment is instead based on the SSID. If it is determined that the SSID thread is not done (912-N), then the flowchart 900A continues to module 914 where the main thread waits for the SSID thread to end (see FIG. 9B).

In any case, the flowchart 900A continues to decision point 916 where it is determined whether VLAN status is OK. If it is determined that VLAN status is not OK (916-N), then the association fails, and the flowchart 900A ends. If, on the other hand, it is determined that the VLAN status is OK (916-Y), then the flowchart 900A continues to module 918 where the user is connected to the VLAN, and the flowchart 900A ends. It should be noted that the calculation of a fallback VLAN in case of failure of the first VLAN need not be done in a loop. For example, all the permutations could be calculated in advance and stored in an array. For four VLANs in a group, for example, the array would have 4!=24 entries, each entry being a list of four VLANs showing the order in which the system should attempt to connect to them. In an alternative, a resource other than VLANs could be selected for the purpose of balancing between users or processes. For example, the method could be implemented to select radio devices or channels, instead of VLANs. The benefits would be similar to that provided with respect to VLANs because bandwidth can be allocated among users while minimizing disruption to any one user or process.

FIG. 9B is intended to illustrate an example of a subsidiary thread that may begin approximately at the same time as the flowchart 900A, or some time after. Authentication and authorization (such as at modules 902-906) may involve communication with an external AAA server, or some other process that entails at least a small delay. Not until the authorization parameters are obtained at can it be known whether a user has an identity-based VLAN or VLAN group assignment. However, an SSID thread's operations do not depend on the user's authorization parameters, and can therefore proceed without waiting for the AAA operations. The exact point at which the subsidiary thread begins may vary depending upon implementation, embodiment, and/or environment. Indeed, the process need not even be parallel. However, since one of the purposes of FIG. 9B is to illustrate the potential for a parallel process, it is assumed that the SSID thread is executed in parallel with the main thread.

In the example of FIG. 9B, the SSID thread starts at decision point 920 where it is determined whether a VLAN (or, e.g., a VLAN group) is specified for the SSID. If a VLAN is specified for the SSID (920-Y), then the flowchart 900B continues to module 922 where the VLAN is selected and instantiated. Selection and instantiation in this case is similar to that described with reference to module 910, but the input includes the VLAN (or VLAN group) specified for the SSID, while at module 910 the VLAN (or VLAN group) is specified for the user.

If, on the other hand, it is determined that a VLAN is not specified for the SSID (920-N), or after the module 922, the flowchart 900B continues to module 924 where the VLAN selection and status are stored. Thus, whether success or failure, the results are stored. For example, if no VLAN (or VLAN group) is specified for the SSID, this is recorded as a failure. Then the SSID thread ends.

Figure 10:
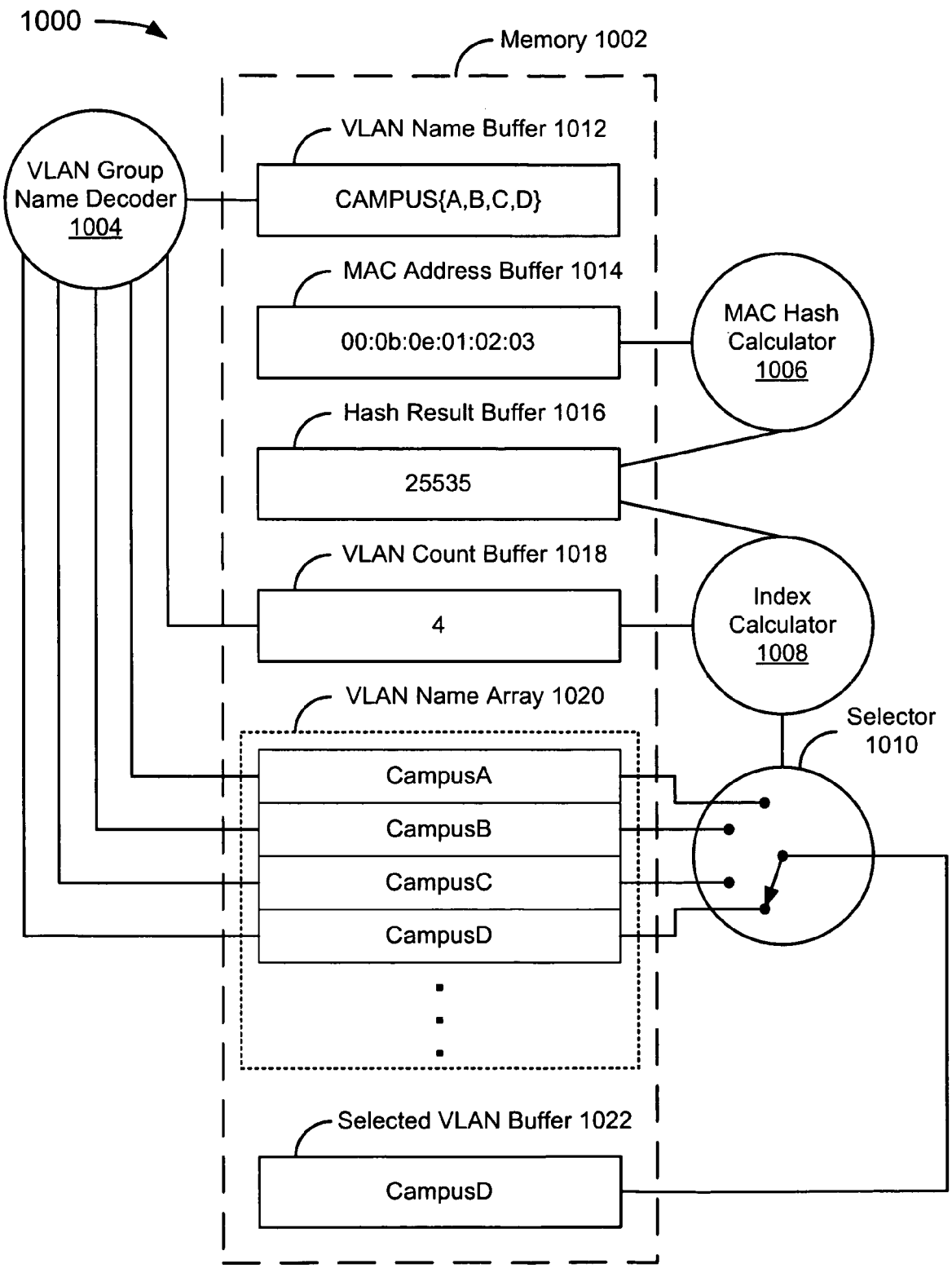
FIG. 10 depicts a conceptual diagram of an example of VLAN selection.

FIG. 10 depicts a conceptual diagram 1000 of an example of VLAN selection. The conceptual diagram 1000 includes memory 1002, a VLAN group name decoder 1004, a MAC hash calculator 1006, an index calculator 1008, and a selector 1010. Additional components, such as one or more processors, are omitted to improve clarity. In the example of FIG. 10, the memory 1002 includes a VLAN name buffer 1012 that stores a VLAN name attribute, a MAC address buffer 1014 that stores the client's hardware address (which may be known, for example, from the client's initial association request), a hash result buffer 1016, a VLAN count buffer 1018, a VLAN name array 1020, and a selected VLAN buffer 1022.

The VLAN name buffer 1012 can store, by way of example but not limitation, a conventional VLAN name string, or a name string containing special characters to guide the VLAN group name decoder 1004 in creating a VLAN list. In the example of FIG. 10, the VLAN name buffer 1012 includes, for illustrative purposes only, the VLAN name CAMPUS {A,B,C,D} which uses the UNIX "C" shell convention to indicate a group. In the UNIX "C" shell convention, the curly braces indicate that a list is to be constructed by successively appending the each of the comma separated elements A, B, C, D to the root CAMPUS. Although a specific syntax (Unix "C" shell) is used in this example, it should be appreciated that a known or convenient method of representing and/or parsing string expressions and of expanding encoded lists could be used, and the VLAN group name decoder 1004 can implement a known or convenient syntax for the application. It may be preferable (though it is not required) to choose group delimiters that are not common in VLAN names, but that are permitted by the interface rules governing the VLAN name attribute in an AAA server.

In operation, the VLAN group name decoder 1004 reads an encoded name from the VLAN name buffer 1012, and decodes the name to obtain decoded list elements. The group name decoder 1004 writes a count of the VLAN list elements into the VLAN count buffer 1018, and the decoded list elements to the VLAN name array 1020.

The MAC hash calculator 1006 processes the MAC address stored in the MAC address buffer 1014 to produce, by way of example but not limitation, an integer, which is stored in the hash result buffer 1016. An example of operation of a hash calculator, such as the MAC hash calculator 1006, is described later in more detail with reference to FIG. 11. It should be noted that a different hash function of the hardware address can be used. Indeed, a function that returns only the last byte of the MAC address could be used in the alternative. If desired, the hash function for an identity-based VLAN assignment can be based on the user's name rather than on the hardware address.

The index calculator 1008 takes the value stored in the hash result buffer 1016 modulo the list length in the VLAN count buffer 1018. In the example of FIG. 10, the value in the hash result buffer 1016 is, for illustrative purposes only, 25535. The list length in the VLAN count buffer 1018 is, for illustrative purposes only, 4. The result from the index calculator 1008 is used as an array index by the selector 1010 to select a name from the VLAN name array 1020. Since 25535% 4=3, the value 3 is used as an array index. This result indicates the fourth list element (numbering array indices from zero). Therefore, the fourth element of the VLAN name array 1020 is selected and copied to the selected VLAN buffer 1022. The components shown in FIG. 10 thus together accomplish the steps of decoding VLAN group membership and choosing a VLAN from the group.

Because the operations are deterministic functions of the user's identity and hardware MAC address, they give the same result regardless of the AP through which the user associates, and the same result even on different controllers running the same software. Therefore, the user maintains the same VLAN assignment while roaming in the wireless network.

Figure 11:
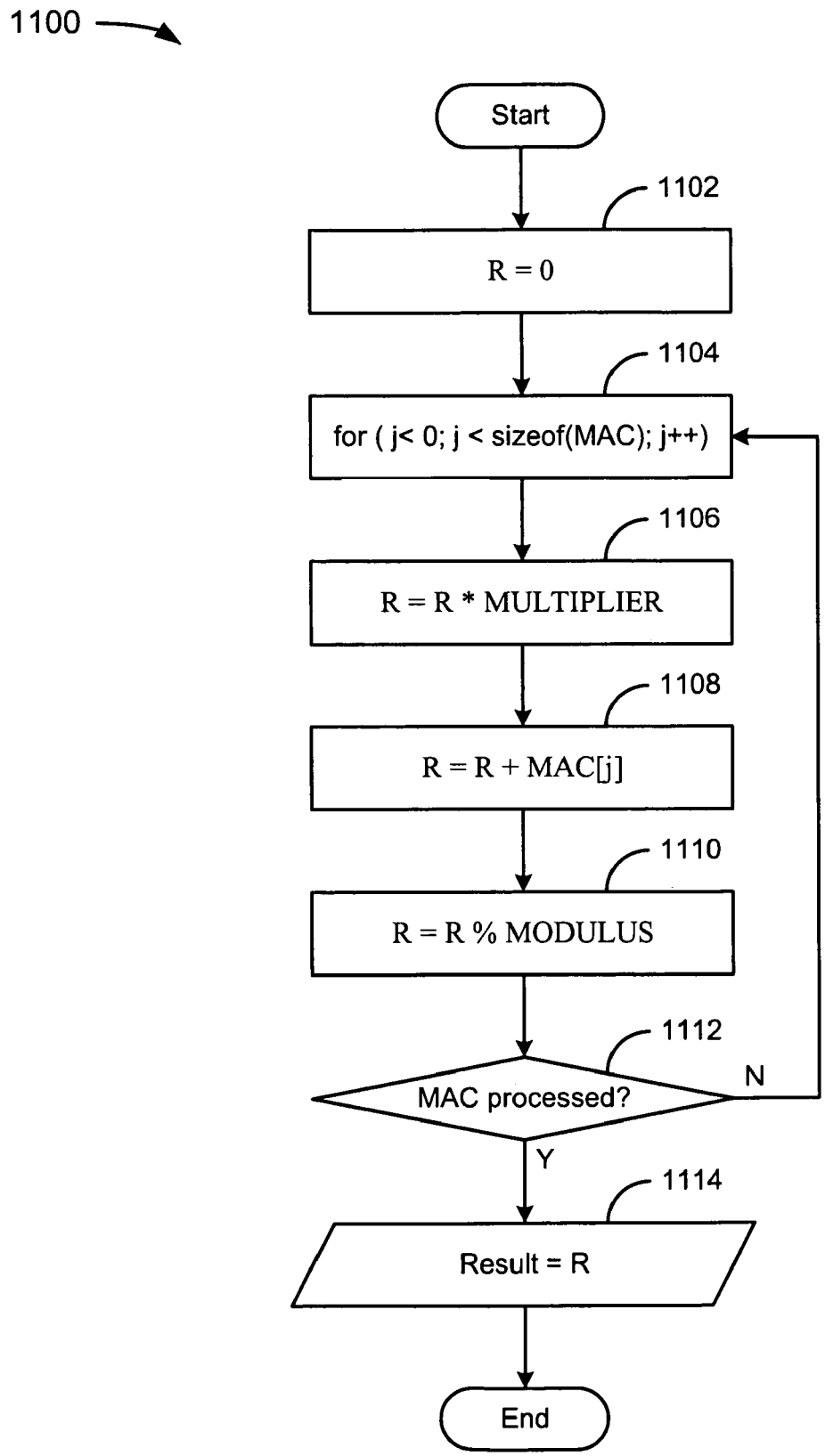
FIG. 11 depicts a flowchart of an example of a method for processing a MAC address for a hash result.

FIG. 11 depicts a flowchart 1100 of an example of a method for processing a MAC address for a hash result. The result is formed in a loop by adding the bytes of the MAC address successively to a partial result.

In the example of FIG. 1, the flowchart 1100 starts at module 1102 with setting R to 0. The flowchart 1100 continues to module 1104 where a loop starts (and continues until each of the bytes of the MAC address have been processed). At module 1106, R is set to R times a MULTIPLIER. The MULTIPLIER may be a preset value (by way of example but not limitation, '31'). At module 1108, R is set to R plus the next byte of the MAC address. At module 1110, R is set to R modulo a MODULUS. The MODULUS may be a preset value (by way of example but not limitation, '216'). It may be noted that an alternative limiting operation could as well be performed implicitly, by using a 16-bit register for the partial result R, so that overflow past 16 bits is discarded at modules 1106 and 1108.

In the example of FIG. 11, the flowchart 1100 continues to decision point 1112, where it is determined whether each byte of the MAC address has been processed. If it is determined that each byte of the MAC address has not yet been processed (1112-N), then the flowchart 1100 continues at module 1106 for another iteration, as described previously. If, on the other hand, it is determined that each byte of the MAC address has been processed (1112-Y), then the flowchart 1100 ends at module 1114, where the result of the function is output. The result of the output should equal R after the last iteration (at module 1110).

Although specific values for the constants MULTIPLIER and MODULUS are described here, other values could also perform well. For instance, MULTIPLIER could be 65599. The algorithm is not particularly sensitive to the choice of MODULUS, but it may be advantageous to use a MODULUS that is at least several times the number of VLANs in a group.

Table 1 is intended to illustrate values at each loop pass for the loop index j, the input MAC byte MAC[j], and the partial results at modules 1106 to 1110, for the same example MAC address shown, for illustrative purposes only, in FIG. 10 (00:0b:0e:01:02:03). The value of R after module 1110 (25535 in this example) is the result that is the output of, for example, the MAC hash calculator 1006 (FIG. 10).

TABLE 1

Values at Each Loop Pass
MAC = 00:0b:0e:01:02:03; MULTIPLIER = 31; MODULUS = 65536

| j | MAC[j] | 1106 | 1108 | 1110 |
|---|--------|------|------|------|
| 0 | 0 | 0 | 0 | 0 |
| 1 | 11 | 0 | 11 | 11 |
| 2 | 14 | 341 | 354 | 354 |
| 3 | 1 | 11005 | 11006 | 11006 |
| 4 | 2 | 341186 | 341188 | 13508 |
| 5 | 3 | 418748 | 418751 | 25535 |

In practice, the MAC hashing and VLAN selection procedure distributes users among VLANs evenly and deterministically. This effect is illustrated in Table 2, which shows results for several consecutive MAC addresses. For illustrative purposes only, there are assumed to be four VLANs in the VLAN group (CampusA, CampusB, CampusC, and CampusD, with array indexes 0, 1, 2, and 3, respectively). It may be noted that the first row corresponds to the MAC address of Table 1, and other rows correspond to MAC addresses calculated using the same procedure. Consecutive addresses are shown for simplicity and may or may not represent a worst-case scenario, perhaps resulting from a single large purchase of network devices from a single vendor. Those skilled in the relevant art will appreciate that a more random distribution of MAC addresses would be more realistic, but that a more random distribution will merely reinforce a tendency to map different users to different VLANs.

In Table 2, the VLAN ($2^{nd}$ choice) column includes the list of VLANs minus the first choice, which presumably was unavailable. Since one VLAN is removed from the list of available VLANs, the Hash Result column associated with the VLAN ($2^{nd}$ choice) is modulo 3 (i.e., the number of remaining available VLANs). In practice, the balance of users among VLANs is maintained even when a VLAN (any of the VLANs) fails.

TABLE 2

VLAN Distributions

| MAC Address | Hash Result | Hash Result mod 4 | VLAN ($1^{st}$ choice) | Hash Result mod 3 | VLAN ($2^{nd}$ choice) |
|---|---|---|---|---|---|
| 00:0b:0e:01:02:01 | 25533 | 1 | CampusB | 0 | CampusA |
| 00:0b:0e:01:02:02 | 25534 | 2 | CampusC | 1 | CampusB |
| 00:0b:0e:01:02:03 | 25535 | 3 | CampusD | 2 | CampusC |
| 00:0b:0e:01:02:04 | 25536 | 0 | CampusA | 0 | CampusB |
| 00:0b:0e:01:02:05 | 25537 | 1 | CampusB | 1 | CampusC |
| 00:0b:0e:01:02:06 | 25538 | 2 | CampusC | 2 | CampusD |
| 00:0b:0e:01:02:07 | 25539 | 3 | CampusD | 0 | CampusA |
| 00:0b:0e:01:02:08 | 25540 | 0 | CampusA | 1 | CampusC |
| 00:0b:0e:01:02:09 | 25541 | 1 | CampusB | 2 | CampusD |

The first MAC address in Table 2, 00:0b:0e:01:02:01, hashes to 25533 and division mod 4 gives 1, so that initially the VLAN at array index 1 (CampusB) is chosen. On the second pass the same value 25533 is divided modulo 3 giving 0, so the VLAN at array index 0 (CampusA) is chosen. The fifth MAC address in the table, 00:0b:0e:01:02:05, hashes to 25537. On the first pass CampusB is selected. On the second pass, 25537 modulo 3 gives 1. However, since CampusB has been removed from the list and the remaining entries have been shifted to close the gap, array index 1 now contains CampusC. The last MAC address in the table, 00:0b:0e:01:02:09, hashes to 25541, which also results in choosing CampusB on the first pass. On the second pass, 25541 modulo 3 gives 2. Array index 2 was formerly CampusC but, because of compaction of the array after removing CampusB, array index 2 on the second pass contains CampusD. Thus the three users that would ordinarily have been assigned to CampusB are now assigned to CampusA, CampusC and CampusD respectively.

Figure 12:
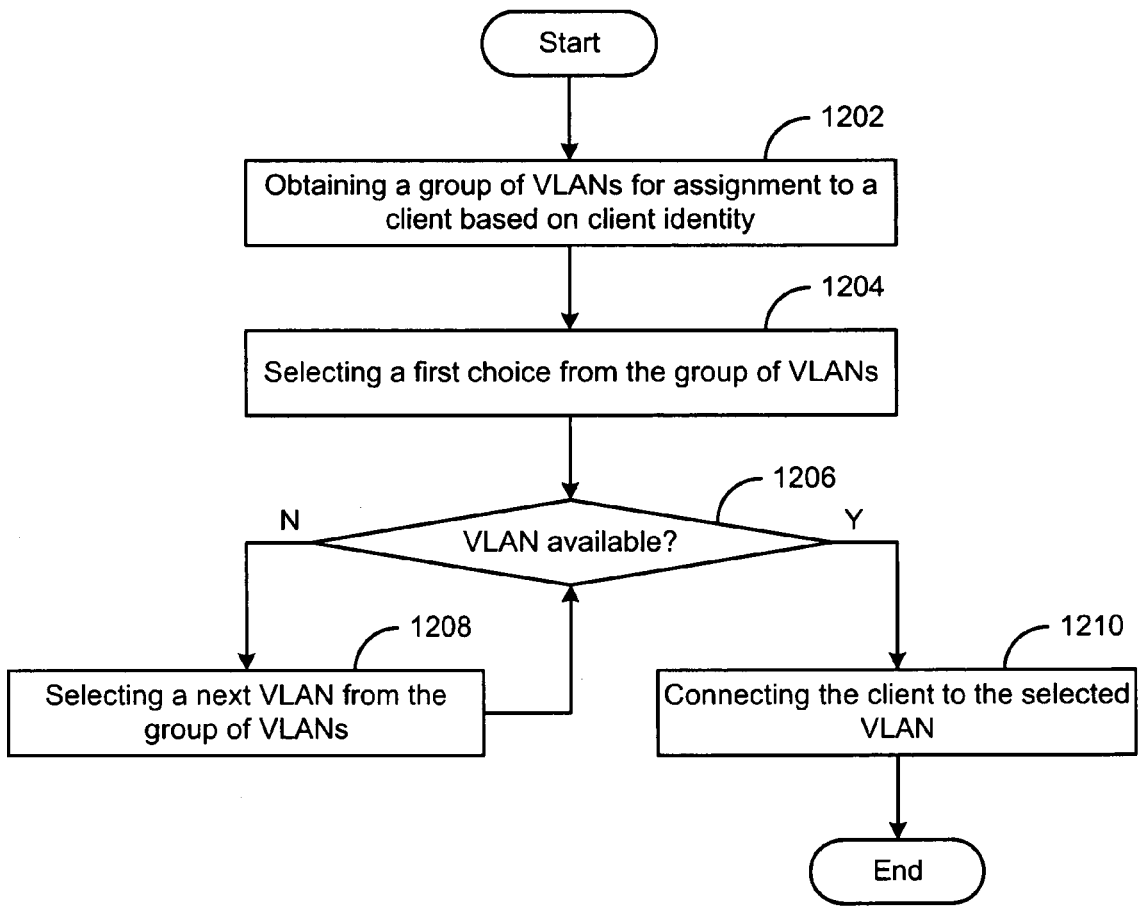
FIG. 12 depicts a flowchart of an example of a method for identity-based connection of a client to a VLAN.

FIG. 12 depicts a flowchart 1200 of an example of a method for identity-based connection of a client to a VLAN. In the example of FIG. 12, the flowchart 1200 starts at module 1202 with obtaining a group of VLANs for assigning to a client based on client identity. The group of VLANs may be obtained as described above, or using any known or convenient method. In the example of FIG. 12, the flowchart 1200 continues to module 1204 with selecting a first choice from the group of VLANs. The selection may be as described above, or using any known or convenient method. In the example of FIG. 12, the flowchart 1200 continues to module 1206 where it is determined whether the selected VLAN is available. If the selected VLAN is unavailable (1206-N), then the flowchart 1200 continues to module 1208 with selecting a next VLAN from the group of VLANs, and the flowchart 1200 loops back to decision point 1206. The selection of the next VLAN from the group may be as described above, or according to any known or convenient technique. For illustrative purposes only, the flowchart 1200 includes an inherent assumption that a VLAN is eventually available (1206-Y), at which point the flowchart 1200 continues to module 1210 with connecting the client to the selected VLAN, and the flowchart 1200 ends.

Terms and examples described above serve illustrative purposes only and are not intended to be limiting. As used herein, the term "embodiment" means an embodiment that serves to illustrate by way of example but not limitation.

It may be noted that the term VLAN maybe used interchangeably with the term subnet. The term VLAN (or subnet) refers to an identified domain that is associated with a user. In some implementations, VLANs are identified system wide using a name string or number. These VLAN names are typically independent of 802.1Q tag values, when used. It should be noted that in an embodiment where VLANs are specified as numbers, a numeric range can be used in place of an encoded list of names.

Authentication methods are well known in the art and can be, for example, 802.1X using PEAP and MS-CHAP. However, any known or convenient method or protocol may be used.

Techniques described herein can be used not only in wireless networks, but also in wired networks, and in networks with both wireless and wired users. For wired users, operations described as based on SSID can be made to depend instead on the physical or logal port, tag, or other identifier showing how the user accessed the network.

Techniques described herein can be used with Ethernet protocols, or other protocols could be used. When other protocols are used, a device serial number, phone number, or other numeric or string value could be used in place of, for example, a MAC address.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system comprising:
memory, including:
a resource name buffer;
an identity buffer;
a result buffer;
a virtual local area network (VLAN) resource count buffer;
a VLAN resource name array;
a selected VLAN resource buffer;
a VLAN resource group name decoder coupled to the resource name buffer, VLAN resource count buffer, and VLAN resource name array;
a value calculator coupled to the identity buffer and the result buffer;
an index calculator coupled to the VLAN resource count buffer;
a selector coupled to the index calculator, VLAN resource name array, and selected VLAN resource buffer;
wherein, in operation, one or more processors are employed such that:
an encoded resource name is stored in the resource name buffer;
an identity parameter is stored in the identity buffer;
the VLAN resource group name decoder reads the encoded resource name, decodes the name to obtain decoded list elements, writes a count of the list elements to the VLAN resource count buffer, and writes the decoded list elements to the VLAN resource name array;
the value calculator processes the identity parameter stored in the identity buffer to produce a value that is stored in the result buffer;
the index calculator takes the value stored in the result buffer modulo the count of the list elements stored in the VLAN resource count buffer;
the selector uses the result of the index calculator as an array index to select a VLAN resource name from the VLAN resource name array and stores the VLAN resource name in the selected VLAN resource buffer;
a wireless station is associated with the VLAN resource identified in the selected VLAN resource buffer.

2. The system of claim 1, wherein, in operation, the resource name buffer stores a VLAN name.

3. The system of claim 1, wherein, in operation, the identity buffer stores a MAC address.

4. The system of claim 1, wherein, in operation, the value calculator processes the identity parameter stored in the identity buffer to produce an integer.

5. The system of claim 1, wherein, the value calculator includes a hash calculator.

6. The system of claim 1, wherein the identity parameter includes one or more portions, and wherein, in operation, the value calculator:
sets a partial result, R, to an initial value;
loops until each of the one or more portions of the identity parameter have been processed, during which the value calculator:
sets R to R times a multiplier;
sets R to R plus a next portion of the identity parameter;
sets R to R modulo a modulus;

obtaining a result that is equal to R after a last iteration of the loop.

7. The system of claim 1, wherein, the VLAN resource name array is a one-dimensional array.

8. The system of claim 1, wherein the decoded list elements are associated with network resources to which a user of the wireless station is authorized access.

9. The system of claim 1, wherein the VLAN resource count buffer includes a single integer value.

10. The system of claim 1, wherein the VLAN resource count buffer is decremented by one if the index calculator generates a result that causes the selector to select a VLAN resource that is not currently available.

\* \* \* \* \*

UNITED STATES PATENT AND TRADEMARK OFFICE
CERTIFICATE OF CORRECTION

PATENT NO.        : 7,724,704 B2                                              Page 1 of 1
APPLICATION NO.   : 11/487722
DATED             : May 25, 2010
INVENTOR(S)       : Simons et al.

It is certified that error appears in the above-identified patent and that said Letters Patent is hereby corrected as shown below:

On Title Page the Item [73] Assignee should be changed from "Beiden Inc." to --Belden Inc.--

Signed and Sealed this

Fifth Day of October, 2010

David J. Kappos
*Director of the United States Patent and Trademark Office*